United States Patent
Lee et al.

(10) Patent No.: US 10,824,611 B2
(45) Date of Patent: Nov. 3, 2020

(54) AUTOMATIC DETERMINATION OF TABLE DISTRIBUTION FOR MULTINODE, DISTRIBUTED DATABASE SYSTEMS

(71) Applicant: SAP SE, Walldorf (DE)

(72) Inventors: Juchang Lee, Seoul (KR); KiYong Lee, Suwon-si (KR); Nosub Sung, Seoul (KR)

(73) Assignee: SAP SE, Walldorf (DE)

( * ) Notice: Subject to any disclaimer, the term of this patent is extended or adjusted under 35 U.S.C. 154(b) by 214 days.

(21) Appl. No.: 16/027,897

(22) Filed: Jul. 5, 2018

(65) Prior Publication Data

US 2020/0012734 A1    Jan. 9, 2020

(51) Int. Cl.
| | |
|---|---|
| G06F 16/20 | (2019.01) |
| G06F 16/22 | (2019.01) |
| G06F 16/27 | (2019.01) |
| G06F 16/23 | (2019.01) |
| G06F 16/2455 | (2019.01) |

(52) U.S. Cl.
CPC ...... G06F 16/2282 (2019.01); G06F 16/2379 (2019.01); G06F 16/2455 (2019.01); G06F 16/27 (2019.01)

(58) Field of Classification Search
None
See application file for complete search history.

(56) References Cited

U.S. PATENT DOCUMENTS

| | | | | |
|---|---|---|---|---|
| 2010/0169335 A1* | 7/2010 | Cai | ........................ | H03M 7/30 707/758 |
| 2014/0052383 A1* | 2/2014 | Larson | ................... | G16B 30/00 702/20 |
| 2016/0026667 A1* | 1/2016 | Mukherjee | .......... | G06F 16/2282 707/714 |
| 2017/0322995 A1* | 11/2017 | Chen | ....................... | H04L 43/16 |

OTHER PUBLICATIONS

"Artificial Intelligence Foundations of Computational Agents," Copyright 2010, retrieved from: https://artint.info/html/ArtInt_89.html, 2 pages.
"Sales and Distribution (SD and SD-Parallel)," SAP, retrieved from: https://www.sap.com/about/benchmark/appbm/erp.sales-distribution-sd-sd-parallel.html, 9 pages.
(Continued)

*Primary Examiner* — Jau Shya Meng
(74) *Attorney, Agent, or Firm* — Klarquist Sparkman, LLP

(57) ABSTRACT

Improvements to the performance of distributed database systems are described. Suggested table distributions are provided that can reduce the performance overhead associated with database operations that involve multiple nodes, and can provide more even distribution of computing resource use. A method includes minimizing a cost function that includes a plurality of performance metrics, at least a portion of the metrics being associated with a weight. Candidate table distributions can be analyzed in an iterative manner to determine a lowest-cost distribution. A final table distribution can be output, such as to a user.

19 Claims, 25 Drawing Sheets

(56) References Cited

OTHER PUBLICATIONS

"SAP HANA Data Warehousing Foundation—Data Distribution Optimizer Administration Guide," SAP Help Portal, retrieved from: https://help.sap.com/viewer/bfa0630d575d473a98ea9e2a14c9d35a/2.0.1.0/en-US/5bd0d0310bff41eeb97bc6e257f08a8f.html, 6 pages.

"Simulated Annealing Options," MathWorks, retrieved from: https://www.mathworks.com/help/gads/simulated-annealing-options.html#bq26j8s-4, 7 pages.

"Simulated Annealing," Biostatistics 615/815 Lecture 19, retrieved from: http://csg.sph.umich.edu/abecasis/class/2006/615.19.pdf, 55 pages.

"Table Distribution in HANA," SAP Active Global Support, Jun. 2012, retrieved from: https://archive.sap.com/kmuuid2/60057459-2acc-3010-fcaf-afa81592a632/Table%20Distribution%20in%20Hana.pdf, 11 pages.

Curino et al., "Schism: A Workload-Driven Approach to Database Replication and Partitioning," Proceedings of the VLDB Endowment, vol. 3, No. 1, Sep. 2010, Singapore, 10 pages.

"ERP Sales and Distribution (SD and SD-Parallel)," SAP, retrieved from https://www.sap.com/about/benchmark/appbm/erp.sales-distribution-sd-sd-parallel.html#sales-distribution-sd-sd-parallel, 3 pages.

Introducing the new SAP HANA capture and replay tool, available with SAP HANA SPS12, SAP, 5 pages.

SAP HANA Administration Guide, SAP, Apr. 12, 2017, 1660 pages.

\* cited by examiner

1310

<Greedy Method>
[Node0] 19.01%: Table 2, Table 6, Table 10, Table 19.1
[Node1] 18.74% : Table 3, Tale 4, Table 12, Table 34
[Node2] 21.94% :Table 19.2, Table 5, Table 17
[Node3] 18.95% : Table 7, Table 23, Table 45, Table 33
[Node4] 21.455 : Table 8, Table 14, Table 43, Table 29
Total Score: 79359.8
A:  B: 1000 C: 1000 D: 0.005
2PC: 78939 => 78937
Table Data Distribution: 0.360958 => 360.958
Execution Count Distribution: 0.0243669 => 24.3639
Multinode Select: 7500 => 37.5

1330

<Simulated Annealing>
[Node0] 20.21%: Table 2, Table 6, Table 14, Table 33
[Node1] 19.88% Table 3, Table 19.1, Table 45, Table 10
[Node 2] 19.76% Table 19.2, Table 5, Table 8, Table 12
[Node 3] 20.05% Table 7, Table 23, Table 14, Table 4
[Node4] 20.09% Table 43, Table 29, Table 17, Table 34
Total Score: 70809.7
A:1 B: 1000 C: 1000 D: 0.005
2PC: 70808 => 70808
Table Data Distribution: 0.00134289 => 1.34289
Execution Count Distribution: 0.000314553 => 0.314553
Multinode Select: 0 => 0

Round Robin Distribution:

| Machine | selbld101 | selbld102 | selbld103 | selbld104 | selbld105 |
|---|---|---|---|---|---|
| Avg. CPU usage (%) | 67.17 | 39.12 | 56.75 | 85.59 | 58.59 |
| Peak. Mem (MB) | 963.47 | 1260.35 | 1395.15 | 1695.21 | 2419.90 |
| Table count | 21 | 20 | 20 | 20 | 20 |
| | /SPE/CD_DOCFLOW | ACCTCR | ACCTHD | ACCTIT | ADRC |
| | ADRCT | ANLY_SD_SETUP | BKPF | BSEG | BSET |
| | BSID | BSIM | BSIS | CDHDR | CEPC |
| | CEPCT | CEPC_BUKRS | CKMI1 | DD01L | DD01T |
| | FAGL_SPLINFO_VAL | FAGL_CARRY_FORW | FAGL_LEDGER_SCEN | FAGL_RAND_WPMAP | FAGL_SPLINFO |
| | FAGLFLEX00 | FAGL_SPLIT_ACTC | FAGL_SPLIT_FIELD | FAGLFLEX03 | FAGLFLEX04 |
| | FAGLFLEX05 | FAGLFLEX01 | FAGLFLEX02 | FAGLFLEX08 | FAGLFLEXA |
| | FAGLFLEXT | FAGLFLEX06 | FAGLFLEX07 | KNA1 | KNB1 |
| | KNC1 | KNEX | KNKK | KNVA | KNVD |
| | KNVI | KNVP | KNVV | KOCLU | KONP |
| | LIKP | LIPS | LTDX | MAKT | MARA |
| | MARC | MARD | MARV | MBEW | MKPF |
| | MLAN | MSEG | MVER | MVKE | NAST |
| | NRIV | NRIVSHADOW | RF04B | S031 | S032 |
| | S066 | S067 | SHP_IDX_GDSI | SJPT_LIKP | TT56F |
| | TUCNTNM_RAW | TUCNTRAW | USRBF2 | VAKPA | VBAK |
| | VBAP | VBBS | VBDATA | VBEP | VBEX |
| | VBFA | VBHDR | VBKD | VBMOD | VBPA |
| | VBRK | VBRP | VBSN | VBUK | VBUP |
| | VBUV | VEPVG | VKDFS | VLKPA | VRKPA |
| | VRFG | | | | |

FIG. 16

TPO #1 Distribution:

| Machine | sefbkd101 | sefbkd102 | sefbkd103 | sefbkd104 | sefbkd105 |
|---|---|---|---|---|---|
| Avg. CPU usage (%) | 54.67 | 60.39 | 39.44 | 56.43 | 67.57 |
| Peak Mem (MB) | 1127.88 | 1464.78 | 2066.94 | 1230.06 | 1217.53 |
| Table count | 19 | 11 | 19 | 26 | 24 |
| | BSIS | ACCTCR | ADRC | /SPE/CD_DOCFLOW | BKPF |
| | DD01L | ACCTHD | ADRCT | BSIM | BSEG |
| | FAGLFLEX01 | ACCTIT | ANLY_SO_SETUP | CEPC | BSET |
| | FAGLFLEXT | CDHDR | CEPC_BUKRS | CEPCT | BSID |
| | KNVI | MSEG | FAGL_CARRY_FORW | DD01T | CKMI1 |
| | KOCLU | RFMB | FAGLFLEX00 | FAGL_LEDGER_SCEN | FAGLFLEX02 |
| | MBEW | VBDATA | FAGLFLEX04 | FAGL_RAND_WPMAP | FAGLFLEX05 |
| | MVER | VBHDR | FAGLFLEX07 | FAGL_SPLINFO | FAGLFLEX06 |
| | NAST | VBMOD | FAGLFLEX08 | FAGL_SPLINFO_VAL | HLP |
| | NRIV | VKDFS | FAGLFLEXA | FAGL_SPLIT_FIELD | KNEX |
| | SHP_IDX_GIDS1 | VRPB | KNKK | FAGLFLEX03 | KNVD |
| | VBAK | | KNVA | KNA1 | KNVP |
| | VBAP | | MAKT | KNB1 | MARA |
| | VBEX | | MLAN | KNC1 | MARC |
| | VBFA | | MVKE | KNVV | MARD |
| | VBKD | | NRIVSHADOW | KONP | MARV |
| | VBRP | | SPT_LKP | LIKP | S066 |
| | VBUK | | T156F | LIPS | S067 |
| | VBUV | | VBRK | LTDX | TUCNTRM_RAW |
| | | | | MKPF | VBBS |
| | | | | S031 | VBEP |
| | | | | S032 | VBSN |
| | | | | TUCNTRAW | VEPVG |
| | | | | USRBF2 | VRKPA |
| | | | | VAKPA | |
| | | | | VBPA | |
| | | | | VBUP | |
| | | | | VLKPA | |

FIG. 17

TPO #2 Distribution:

| Machine | selbld101 | selbld102 | selbld103 | selbld104 | selbld105 |
|---|---|---|---|---|---|
| Avg. CPU usage (%) | 44.98 | 73.93 | 66.18 | 77.08 | 59.84 |
| Peak. Mem (MB) | 1617.24 | 1211.28 | 1333.13 | 1258.00 | 950.76 |
| Table count | 17 | 20 | 11 | 28 | 25 |
| | ADRC | ADRCT | ACCTCR | /SPE/CO_DOCFLOW | BSET |
| | CEPC | BSEG | ACCTHD | ANLY_SD_SETUP | BSIM |
| | FAGL_SPLIT_FIELD | BSID | ACCTIT | BKPF | CRM1 |
| | FAGLFLEX07 | CEPCT | COBKR | BSIS | FAGLFLEX01 |
| | FAGLFLEXA | FAGLFLEX04 | FAGL_LEDGER_SCEN | CEPC_BUKRS | FAGLFLEX02 |
| | KNA1 | FAGLFLEX06 | MSEG | DD01L | FAGLFLEX08 |
| | KNB1 | KONV | RFBLG | DD01T | FILP |
| | KNC1 | KONX | V6DATA | FAGL_CARRY_FORW | KNVP |
| | KNVA | KNV1 | VBHDR | FAGL_RAKQ_WPMAP | KCMP |
| | NAST | NRIV | VBMOD | FAGL_SPLINFO | LFP |
| | MARA | MVKE | VKDFS | FAGL_SPLINFO_VAL | LIPS |
| | MEAN | NAST | | FAGLFLEX00 | TDX |
| | NRIV | RRINSHADOW | | FAGLFLEX03 | MARC |
| | T156F | SHP_IDX_GOBI | | FAGLFLEX05 | MARV |
| | VAKPA | TUCRTTNXR_RAW | | FAGLFLEXT | MBEW |
| | VBBS | VBAP | | KNDX | MKPF |
| | VBSN | VBFA | | KOGLI | SD66 |
| | | VBPA | | MARD | USRBF2 |
| | | VBRK | | MVER | VBAK |
| | | MRF6 | | SD31 | VBAP |
| | | | | SD32 | VBKD |
| | | | | SD67 | VBUK |
| | | | | SPT_LKP | VBUP |
| | | | | TUCRTTRAW | VLCPA |
| | | | | VBEX | VRKPA |
| | | | | VBPP | |
| | | | | VBUV | |
| | | | | VEPVG | |

FIG. 18

TPO #3 Distribution:

| Machine | selfbkd101 | selfbkd102 | selfbkd103 | selfbkd104 | selfbkd105 |
|---|---|---|---|---|---|
| Avg. CPU usage (%) | 65.01 | 82.19 | 73.91 | 57.81 | 66.32 |
| Peak. Mem (MB) | 942.49 | 1100.06 | 1329.47 | 1247.83 | 1325.58 |
| Table count | 23 | 27 | 23 | 17 | 11 |
| | ADRCT | SPE/D_DOCFLOW | ACCTCR | ANLY_SD_SETUP | BSIS |
| | BSIM | ACCTHD | ACCTIT | CEPCT | FAGL_SPLINFO |
| | CKMI1 | ADRC | BSID | FAGL_SPLIT_FIELD | KNVP |
| | DD01T | BKPF | CDHDR | FAGLFLEX00 | LIKP |
| | FAGL_SPLINFO_VAL | BSEG | FAGL_CARRY_FORW | FAGLFLEX09 | MARA |
| | FAGLFLEX02 | BSET | FAGL_LEDGER_SCEN | FAGLFLEXA | MSEG |
| | FAGLFLEX03 | CEPC | FAGLFLEX07 | KNEX | SD46 |
| | FAGLFLEX04 | EPC_BLKRS | FAGLFLEXT | KNVI | USR02 |
| | FAGLFLEX05 | DD21L | HLP | KOIP | VBDATA |
| | FAGLFLEX06 | FAGL_RANG_WPMAP | KNA1 | MAAT | VBFA |
| | KNKK | FAGLFLEX01 | KNB1 | MARC | VBUK |
| | KNA | KNVD | KNC1 | MEW | |
| | KOCLU | LFS | KNVV | MLAN | |
| | MSEG | MARV | LTDX | MVKE | |
| | NAST | MRV | MARD | SHP_IDX_GDS | |
| | RFBLG | MV/SHADOW | MKPF | TLCNTNM_RAW | |
| | SD01 | SD02 | VBAK | VBRS | |
| | SD07 | TUCNTRAW | VBAP | | |
| | SPIT_LKP | VBEP | VBHDR | | |
| | T156F | VBEX | VBKD | | |
| | VAKPA | VBFA | VBSN | | |
| | VBMOD | VBRP | VBLP | | |
| | VBRK | VBUV | VBRS | | |
| | | VEPVG | | | |
| | | VKDFS | | | |
| | | VLPA | | | |
| | | VRKPA | | | |

FIG. 19

TPO #4 Distribution:

| Machine | setbld101 | setbld102 | setbld103 | setbld104 | setbld105 |
|---|---|---|---|---|---|
| Avg. CPU usage (%) | 66.04 | 33.82 | 59.19 | 45.96 | 66.66 |
| Peak Mem (MB) | 1128.07 | 1594.11 | 1065.79 | 802.96 | 1135.52 |
| Table count | 19 | 16 | 25 | 28 | 13 |
| | ACCTHD | ADRC | SPEC0_DOCFLOW | BSIM | ACCTCR |
| | CD01L | ADRCT | ACCTIT | BSIS | ANLY_SD_SETUP |
| | FAGL_BAND_WPMAP | CEPC | BKPF | CKMI1 | BSEG |
| | FAGL_SPLINFO_VAL | CEPC_BUKRS | BSID | FAGL_CARRY_FORW | BSET |
| | FAGLFLEXT | FAGLFLEX01 | CEPCT | FAGL_LEDGER_SCEN | FAGL_SPLIT_FIELD |
| | KONV | FAGLFLEX04 | CKMT1 | FAGLFLEX02 | FAGLFLEX08 |
| | MARD | FAGLFLEXA | FAGL_SPLINFO | FAGLFLEX06 | FAGLFLEX05 |
| | MSEG | KNA1 | FAGLFLEX03 | HLP | MARC |
| | SD01 | KNB1 | FAGLFLEX07 | KNKK | MKPF |
| | SD66 | MAKT | FAGLFLEX09 | KNVA | RSRRF2 |
| | SD67 | MARA | KNC1 | KNVO | VBDATA |
| | VBAK | MARV | KNEX | KNV1 | VBHDR |
| | VBAP | MLAN | LIKP | KNVP | VKDF5 |
| | VBEX | NAST | LTDX | KCOLU | |
| | VBFA | NRIV | MVER | KONP | |
| | VBKD | V88S | NRIVSHADOW | LIPS | |
| | VBLK | | BP048 | MBEW | |
| | VBUV | | SD32 | MKKE | |
| | VLKPA | | SPPT_LKP | SHP_IDX_GOSI | |
| | | | TUCNTNM_RAW | T156F | |
| | | | VAKPA | TUCNTRAW | |
| | | | VBMOD | VBEP | |
| | | | VBPA | VBFK | |
| | | | VREPA | VBRP | |
| | | | WRF6 | VBSN | |
| | | | | VBUP | |
| | | | | VEPVG | |
| | | | | CDHDR | |

FIG. 20

TPO #5 Distribution:

| Machine | selbkd101 | selbkd102 | selbkd103 | selbkd104 | selbkd105 |
|---|---|---|---|---|---|
| Avg. CPU usage (%) | 84.97 | 56.84 | 68.77 | 55.83 | 35.61 |
| Peak. Mem (MB) | 992.84 | 1091.08 | 1307.56 | 925.36 | 1031.99 |
| Table count | 18 | 20 | 23 | 25 | 15 |
| | ACCTIT | ACCTCR | BKPF | SPE/CD_DOCFLOW | ADRC |
| | BSEG | ACCTHD | BSIM | ANLY_SD_SETUP | ADRCT |
| | FAGL_CARRY_FORW | BSIS | CDHDR | BSID | BSET |
| | FAGL_SPLINFO_VAL | CEPCT | CEPC_BURRS | CKMI1 | CEPC |
| | FAGLFLEX02 | DD01L | FAGL_LEDGER_SCEN | FAGL_BAND_WPMAP | FAGLADXA |
| | FAGLFLEX07 | DD01T | FAGLFLEX03 | FAGL_SPLINFO | KNEX |
| | KNVI | FAGLFLEX00 | FAGLFLEX05 | FAGLFLEX04 | KNKK |
| | LIKP | FAGLFLEX01 | FAGLFLEX08 | FAGLFLEX06 | KOCLU |
| | MAKT | KNA1 | FAGLFLEXT | KLP | KOMP |
| | MARA | KNB1 | KNC1 | KNVD | MARC |
| | MARD | LIPS | KNVA | KNVV | MARV |
| | MSEG | TDX | KNVP | MKPF | MLAN |
| | MAST | MVER | MBEW | RF048 | VBBS |
| | SPT_LKP | NRIV/SHADOW | MVKE | S031 | VBSN |
| | VBAK | S067 | MRV | S066 | VKPF6 |
| | VBAP | SHP_IDX_GDSI | S032 | T156F | |
| | VBEX | TUCMTRAW | VBPA | TUCNTNM_RAW | |
| | VBPA | VAKPA | VBUK | USR02 | |
| | | VBDATA | VBUP | V8HDR | |
| | | VBFP | VBLV | VBKD | |
| | | | VEPVG | VBMOD | |
| | | | VLKPA | VBK | |
| | | | | VBPP | |
| | | | | VKDFS | |
| | | | | VRKPA | |

FIG. 21

AUTOMATIC DETERMINATION OF TABLE DISTRIBUTION FOR MULTINODE, DISTRIBUTED DATABASE SYSTEMS

FIELD

The present disclosure generally relates to distributed database systems. Particular implementations relate to determining table distributions among nodes of the distributed database system to provide improved performance and resource use.

BACKGROUND

Database systems increasingly hold amounts of data that are too large to be hosted on a single computing device. Thus, databases often have data distributed across multiple computing devices, or nodes. Each of the nodes may have its own memory, processor, and logic for carrying out database operations.

While distributed database systems can provide various advantages, efficiently operating a distributed database system can be challenging. Part of the challenge can relate to database read and write operations that involve tables, or table partitions, hosted by different nodes. Thus, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for improving the performance of distributed database systems. The technologies provide suggested table distributions that can reduce the performance overhead associated with database operations that involve multiple nodes, and can provide more even distribution of computing resource use. In a particular example, a method includes minimizing a scoring (or cost) function that includes a plurality of performance metrics, at least a portion of the metrics being associated with a weight. Candidate table distributions can be analyzed in an iterative manner to determine a lowest-score distribution. A final table distribution can be output, such as to a user.

In one embodiment, a method is provided for determining a table distribution in a multinode database system. Database execution data is received. The database execution data includes a plurality of read and write requests that are executable in the multinode database system. The read and write requests can be associated with a plurality of statements, at least a portion of which can be associated with transactions. A plurality of tables associated with the plurality of read and write requests are determined. The plurality of tables can represent tables whose distribution is to be optimized.

A first score is determined that is associated with the current table distribution. The score can be determined by calculating one or more execution metrics resulting from (or that would result from) executing the plurality of read and write requests using the current table distribution. The scores can include a number of two-phase commit operations or multinode select operations that would be incurred by executing the read and write requests, or metrics regarding the distribution of computing resource use with a given table distribution. A second score associated with the iterated distribution is determined, and be calculated in a similar manner as the first score.

The first and second scores are compared. Based at least in part on the comparing, the current table distribution or the iterated table distribution is selected as the current table distribution. That is, either the current distribution is maintained for further analysis or the current distribution is replaced by the iterated distribution. The modifying, determining a first score, determining a second score, comparing, and selecting are iteratively carried out until a stopping condition is met. The stopping condition can be a number of iterations, a running time, a parameter value associated with an optimization method (such as a temperature for a simulated annealing method), or the satisfaction of a threshold score. A final table distribution is output.

According to a further aspect, another method is provided for determining a table distribution in a multinode database system. Database execution data is received. The database execution data includes a plurality of read and write requests that are executable in the multinode database system. The read and write requests can be associated with a plurality of statements, at least a portion of which can be associated with transactions. A plurality of tables associated with the plurality of read and write requests are determined. The plurality of tables can represent tables whose distribution is to be optimized.

A suggested distribution of the plurality of tables among the multiple nodes is determined. The determining can include obtaining a current table distribution. A location of at least one of the plurality of tables among the multiple nodes is modified at to provide an iterated table distribution.

A first score is determined that is associated with the current table distribution. The score can be determined by calculating one or more execution metrics resulting from (or that would result from) executing the plurality of read and write requests using the current table distribution. The scores can include a number of two-phase commit operations or multinode select operations that would be incurred by executing the read and write requests, or metrics regarding the distribution of computing resource use with a given table distribution. A second score associated with the iterated distribution is determined and can be calculated in a similar manner as the first score.

The first and second scores are compared. Based at least in part on the comparing, the current table distribution or the iterated table distribution is selected as the current table distribution. That is, either the current distribution is maintained for further analysis or the current distribution is replaced by the iterated distribution. The modifying, determining a first score, determining a second score, comparing, and selecting are iteratively carried out until a stopping condition is met. The stopping condition can be a number of iterations, a running time, a parameter value associated with an optimization method (such as a temperature for a simulated annealing method), or the satisfaction of a threshold score.

A final table distribution is output. User input is received to implement the final table distribution. Tables are automatically moved among the multiple nodes to achieve the final table distribution.

According to a further aspect, another method is provided for determining a table distribution in a multinode database system. Database execution data is received. The database execution data includes a plurality of read and write requests that are executable in the multinode database system. The read and write requests can be associated with a plurality of statements, at least a portion of which can be associated with transactions. A plurality of tables associated with the plurality of read and write requests are determined. A suggested distribution of the plurality of tables among the multiple nodes is determined. The determining includes minimizing a scoring function that includes a plurality of performance metrics. At least a portion of the performance metrics are associated with weighting factors. The minimizing includes iteratively comparing scores of candidate table distributions. A final table distribution is output, such as to a user on a display device, or provided to a software application.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 13 provides example output of a table placement component, including comparing results from a greedy method and a simulated annealing method.

FIG. 15 presents performance metrics measured during execution of a sample database workload using table distributions provided by a round robin algorithm, three trials of a random placement method, and five trials of a simulated annealing method.

FIGS. 16-21 present table distributions determined using the placement methods of FIG. 15.

DETAILED DESCRIPTION

Example 1—Overview

It is often of interest to optimize the processing of database operations. Database systems commonly operate using online transaction processing (OLTP) workloads, which are typically transaction-oriented, or online analytical processing (OLAP) workloads, which typically involve data analysis. OLTP transactions are commonly used for core business functions, such as entering, manipulating, or retrieving operational data, and users typically expect transactions or queries to be completed quickly. For example, OLTP transactions can include operations such as INSERT, UPDATE, and DELETE, and comparatively simple queries. OLAP workloads typically involve queries used for enterprise resource planning and other types of business intelligence. OLAP workloads commonly perform few, if any, updates to database records, rather, they typically read and analyze past transactions, often in large numbers. Because OLAP processes can involve complex analysis of a large number of records, they can require significant processing time.

Timely processing of OLTP workloads is important, as they can directly affect business operation and performance. However, timely processing of OLAP workloads is also important, as even relatively small improvements can result in significant time savings.

The programs responsible for implementing a database system are typically periodically updated. In addition, users, such as database administrators, may wish to change various database parameters in order to determine whether such changes may improve database performance.

Migrating a database system to a new program version, or seeking to optimize database operational parameters, can be problematic. For example, for a production (currently in operational use) database system, parameter or software version changes may negatively affect the usability, stability, or speed of the database system. Users may seek to create a test database system in order to evaluate the performance impact of using a new program version, or changing the parameters of a new or existing program version, in order to avoid negative impacts on a production database system.

In at least some embodiments, a workload refers to an amount of work, such as work involving data transfer or processing at a database system, over time. The workload can include requests for database operations received by the database system from database clients. The workload can also include internal database operations, such as transferring or copying information in memory to persistent storage, the generation of temporary tables or other data (including data or metadata associated with a request for a database operation), and incorporating of temporary or other data into primary data sources.

Figure 1:
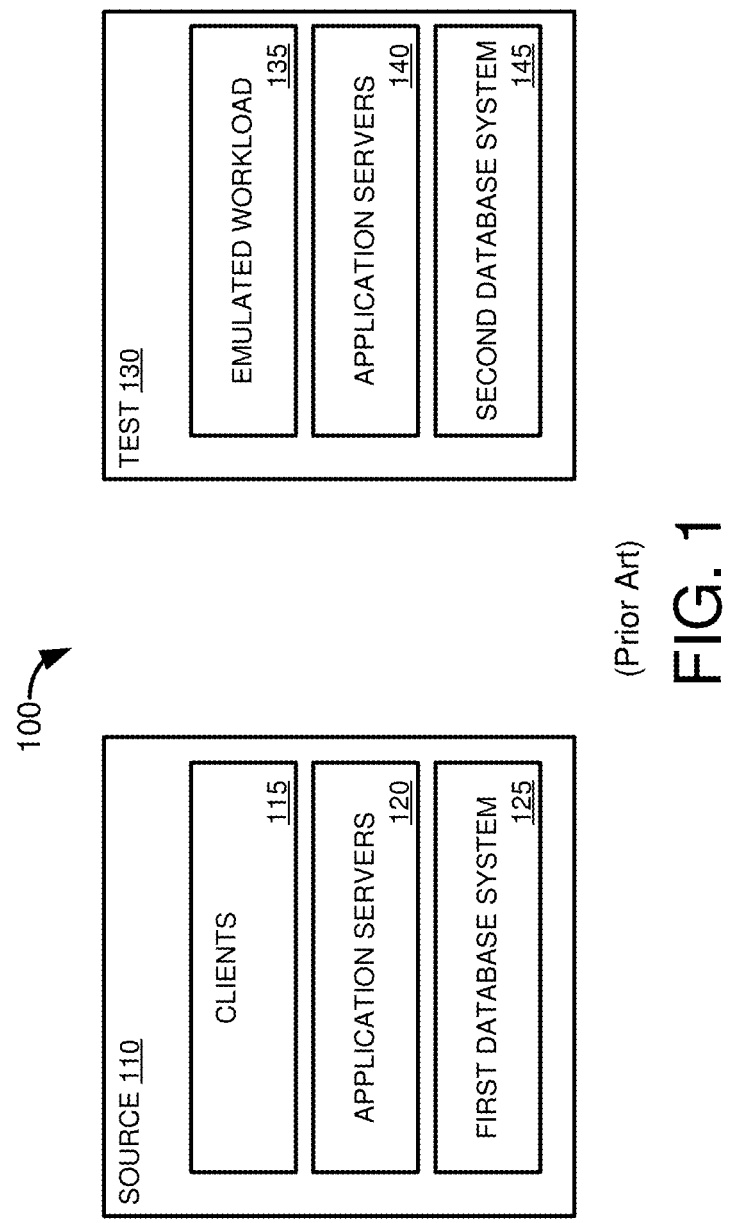
FIG. 1 is a diagram depicting a first database environment having a first database system and a second database environment having a second database system executing an emulated workload of the first database system.

FIG. 1 illustrates a database environment 100 having a first, source database environment 110 that includes one or more clients 115, one or more applications servers 120 available to service requests for database operations from the clients, and a first database system 125 on which the database operations are carried out. The database environment 100 also includes a second, test database environment 130 having an emulated workload 135, such as a workload that seeks to replicate a workload produced by the clients 115 of the first database environment 110. The second database environment 130 includes application servers 140 to service requests for database operations from the emulated workload 135. The database operations are carried out on a second database system, such as a database system 145, having different operational parameters or a different software version than the first database system 125.

Testing the performance of the second database system 145 under a workload at least similar to that experienced by the first database system 125 can be problematic. Typically, a test database system is evaluated using an artificially generated workload, such as the emulated workload 135. However, these artificial workloads may not accurately reflect the actual workloads experienced by the first, production database system 125. Thus, predicted negative or positive performance impacts observed on the second database system 145 may not accurately reflect performance under a workload experienced by the first database system 125.

Capturing a workload from the first database environment 110 to run at the second database environment 130 can also be problematic. For example, it may be difficult to capture all the inputs necessary to replicate the workload generated by the clients 115. In addition, the capture process itself may negatively impact the performance of the first database system 125, such as by increasing the processing load on a computing system operating the database system, or delaying processing of operations on the first database system 125.

Figure 2:
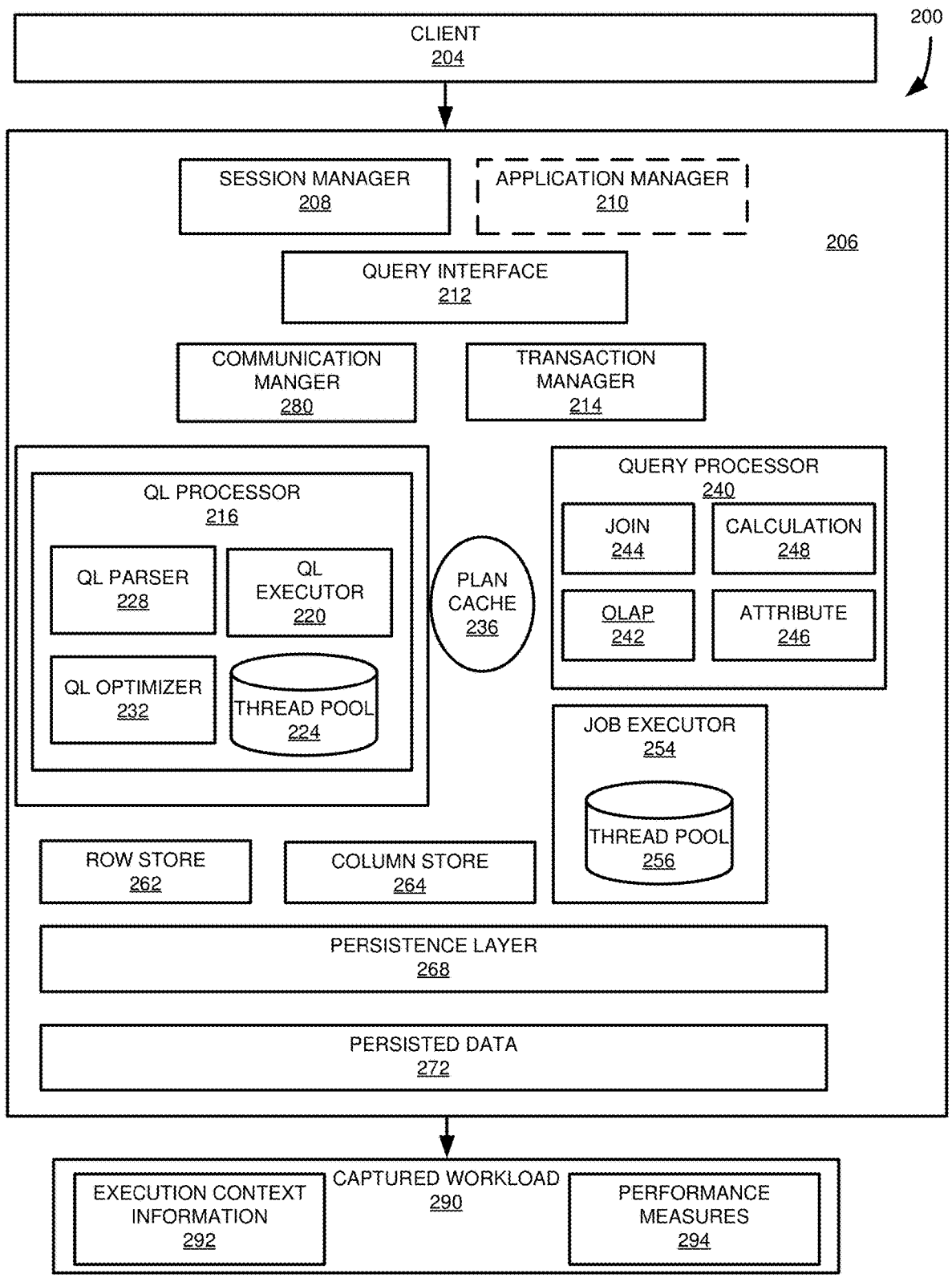
FIG. 2 is a diagram depicting a database environment providing for processing of requests for database operations.

FIG. 2 illustrates an example database environment 200. The database environment 200 can include a client 204. Although a single client 204 is shown, the client 204 can represent multiple clients. The client or clients 204 may be OLAP clients, OLTP clients, or a combination thereof.

The client 204 is in communication with a database server 206. Through various subcomponents, the database server 206 can process requests for database operations, such as requests to store, read, or manipulate data. A session manager component 208 can be responsible for managing connections between the client 204 and the database server 206, such as clients communicating with the database server using a database programming interface, such as Java Database Connectivity (JDBC), Open Database Connectivity (ODBC), or Database Shared Library (DBSL). Typically, the session manager 208 can simultaneously manage connections with multiple clients 204. The session manager 208 can carry out functions such as creating a new session for a client request, assigning a client request to an existing session, and authenticating access to the database server 206. For each session, the session manager 208 can maintain a context that stores a set of parameters related to the session, such as settings related to committing database transactions or the transaction isolation level (such as statement level isolation or transaction level isolation).

For other types of clients 204, such as web-based clients (such as a client using the HTTP protocol or a similar transport protocol), the client can interface with an application manager component 210. Although shown as a component of the database server 206, in other implementations, the application manager 210 can be located outside of, but in communication with, the database server 206. The application manager 210 can initiate new database sessions with the database server 206, and carry out other functions, in a similar manner to the session manager 208.

The application manager 210 can determine the type of application making a request for a database operation and mediate execution of the request at the database server 206, such as by invoking or executing procedure calls, generating query language statements, or converting data between formats useable by the client 204 and the database server 206. In particular examples, the application manager 210 receives requests for database operations from a client 204, but does not store information, such as state information, related to the requests.

Once a connection is established between the client 204 and the database server 206, including when established through the application manager 210, execution of client requests is usually carried out using a query language, such as the structured query language (SQL). In executing the request, the session manager 208 and application manager 210 may communicate with a query interface 212. The query interface 212 can be responsible for creating connections with appropriate execution components of the database server 206. The query interface 212 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 214. The transaction manager component 214 can be responsible for operations such as coordinating transactions, managing transaction isolation, tracking running and closed transactions, and managing the commit or rollback of transactions. In carrying out these operations, the transaction manager 214 can communicate with other components of the database server 206.

The query interface 212 can communicate with a query language processor 216, such as a structured query language processor. For example, the query interface 212 may forward to the query language processor 216 query language statements or other database operation requests from the client 204. The query language processor 216 can include a query language executor 220, such as a SQL executor, which can include a thread pool 224. Some requests for database operations, or components thereof, can be executed directly by the query language processor 216. Other requests, or components thereof, can be forwarded by the query language processor 216 to another component of the database server 206. For example, transaction control statements (such as commit or rollback operations) can be forwarded by the query language processor 216 to the transaction manager 214. In at least some cases, the query language processor 216 is responsible for carrying out operations that retrieve or manipulate data (e.g., SELECT, UPDATE, DELETE). Other types of operations, such as queries, can be sent by the query language processor 216 to other components of the database server 206. The query interface 212, and the session manager 208, can maintain and manage context information associated with requests for database operation. In particular implementations, the query interface 212 can maintain and manage context information for requests received through the application manager 210.

When a connection is established between the client 204 and the database server 206 by the session manager 208 or the application manager 210, a client request, such as a query, can be assigned to a thread of the thread pool 224, such as using the query interface 212. In at least one implementation, a thread is associated with a context for executing a processing activity. The thread can be managed by an operating system of the database server 206, or by, or in combination with, another component of the database server. Typically, at any point, the thread pool 224 contains a plurality of threads. In at least some cases, the number of threads in the thread pool 224 can be dynamically adjusted, such in response to a level of activity at the database server 206. Each thread of the thread pool 224, in particular aspects, can be assigned to a plurality of different sessions.

When a query is received, the session manager 208 or the application manager 210 can determine whether an execution plan for the query already exists, such as in a plan cache 236. If a query execution plan exists, the cached execution plan can be retrieved and forwarded to the query language executor 220, such as using the query interface 212. For example, the query can be sent to an execution thread of the thread pool 224 determined by the session manager 208 or the application manager 210. In a particular example, the query plan is implemented as an abstract data type.

If the query is not associated with an existing execution plan, the query can be parsed using a query language parser 228. The query language parser 228 can, for example, check query language statements of the query to make sure they have correct syntax, and confirm that the statements are otherwise valid. For example, the query language parser 228 can check to see if tables and records recited in the query language statements are defined in the database server 206.

The query can also be optimized using a query language optimizer 232. The query language optimizer 232 can manipulate elements of the query language statement to allow the query to be processed more efficiently. For example, the query language optimizer 232 may perform operations such as unnesting queries or determining an optimized execution order for various operations in the query, such as operations within a statement. After optimization, an execution plan can be generated, or compiled, for the query. In at least some cases, the execution plan can be cached, such as in the plan cache 236, which can be retrieved (such as by the session manager 208 or the application manager 210) if the query is received again.

Once a query execution plan has been generated or received, the query language executor 220 can oversee the execution of an execution plan for the query. For example, the query language executor 220 can invoke appropriate subcomponents of the database server 206.

In executing the query, the query language executor 220 can call a query processor 240, which can include one or more query processing engines. The query processing engines can include, for example, an OLAP engine 242, a join engine 244, an attribute engine 246, or a calculation engine 248. The OLAP engine 242 can, for example, apply rules to create an optimized execution plan for an OLAP query. The join engine 244 can be used to implement relational operators, typically for non-OLAP queries, such as join and aggregation operations. In a particular implementation, the attribute engine 246 can implement column data structures and access operations. For example, the attribute engine 246 can implement merge functions and query processing functions, such as scanning columns.

In certain situations, such as if the query involves complex or internally-parallelized operations or sub-operations, the query executor 220 can send operations or sub-operations of the query to a job executor component 254, which can include a thread pool 256. An execution plan for the query can include a plurality of plan operators. Each job execution thread of the job execution thread pool 256, in a particular implementation, can be assigned to an individual plan operator. The job executor component 254 can be used to execute at least a portion of the operators of the query in parallel. In some cases, plan operators can be further divided and parallelized, such as having operations concurrently access different parts of the same table. Using the job executor component 254 can increase the load on one or more processing units of the database server 206, but can improve execution time of the query.

The query processing engines of the query processor 240 can access data stored in the database server 206. Data can be stored in a row-wise format in a row store 262, or in a column-wise format in a column store 264. In at least some cases, data can be transformed between a row-wise format and a column-wise format. A particular operation carried out by the query processor 240 may access or manipulate data in the row store 262, the column store 264, or, at least for certain types of operations (such as a join, merge, and subquery), both the row store 262 and the column store 264. In at least some aspects, the row store 262 and the column store 264 can be maintained in main memory.

A persistence layer 268 can be in communication with the row store 262 and the column store 264. The persistence layer 268 can be responsible for actions such as committing write transaction, storing redo log entries, rolling back transactions, and periodically writing data to storage to provided persisted data 272.

In executing a request for a database operation, such as a query or a transaction, the database server 206 may need to access information stored at another location, such as another database server. The database server 206 may include a communication manager 280 component to manage such communications. The communication manger 280 can also mediate communications between the database server 206 and the client 204 or the application manager 210, when the application manager is located outside of the database server.

In some cases, the database server 206 can be part of a distributed database system that includes multiple database servers. At least a portion of the database servers may include some or all of the components of the database server 206. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 206 may need to access other database servers, or other information sources, within the database system. The communication manager 280 can be used to mediate such communications. For example, the communication manager 280 can receive and route requests for information from components of the database server 206 (or from another database server) and receive and route replies.

One or more components of the database system 200, including components of the database server 206, can be used to produce a captured workload 290 that includes execution context information 292 and one or more performance measures 294. The captured workload 290 can be replayed, such as after being processed, at another database system.

Captured database workloads can be used for purposes other than testing a target database system or comparing the performance of a source database system with a target system. For example, a captured workload can be analyzed to determine ways in which the existing database system, or a new or modified database system, might be modified to improve performance.

Figure 3A:
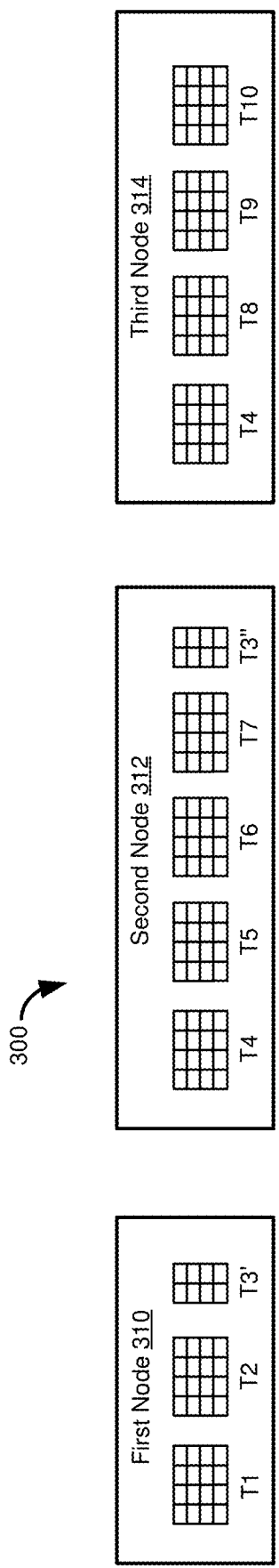
FIGS. 3A and 3B illustrate different table distributions in a three-node distributed database environment, where the distributions can result in different performance characteristics for a given workload.
Figure 3B:
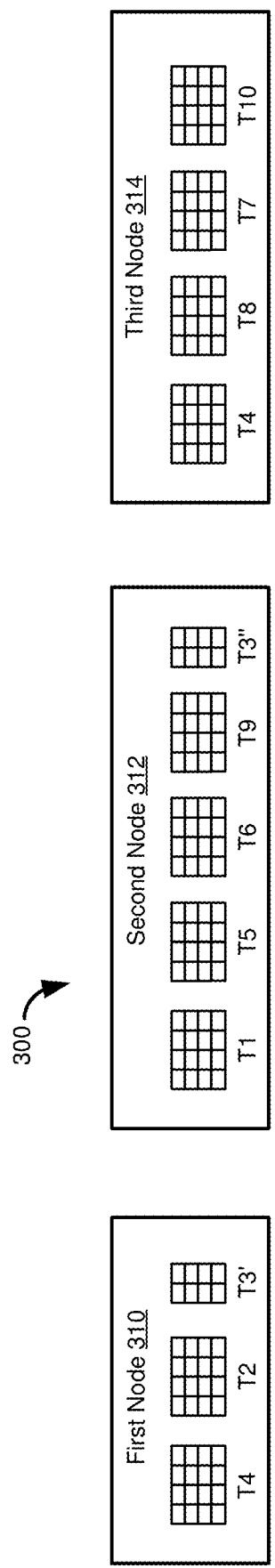

In particular, captured database workloads can be analyzed to determine how table placement and table partitioning can be improved from an initial state of the source database system (i.e., the state of the database system during the workload capture). As an example of how table placement and partitioning can affect database performance, FIGS. 3A and 3B illustrate a database environment 300 having a first node 310, a second node 312, and a third node 314. In FIG. 3A, the first node 310 includes Table T1, Table T2, and a first portion of Table T3. The second node 312 includes Table T4, Table T5, Table T6, Table T7, and a second portion of Table T3. The third node 314 includes Table T4, Table T8, Table T9, and Table T10.

As can be seen in FIG. 3A, a table can be maintained as a single table, such as Table T1, or can be partitioned, such as Table T3. Relational database tables can be partitioned vertically (i.e., having some attributes in different tables) or horizontally (e.g., having some records in different tables). Although Table T3 is shown as having partitions on different nodes, in some cases, a node can store multiple, including all, partitions of a table. FIG. 3A also illustrates that a table, such as Table T4, can be replicated at multiple nodes. Although not shown, a table can be both replicated and partitioned.

Consider a first query that involves a first join on T1 and T5 and joins that result with the result of a second join on T6 and T9. In this case, given the distribution of FIG. 3A, the first query involves two cross-node joins, which can be more computationally expensive, such as requiring a larger number of network communications or a greater amount of bandwidth, compared with a join where tables are located on the same node. Similarly, even a non-join operation that selects (or modifies) records from multiple tables can incur higher scores when the relevant tables are located at different nodes. Transactions that involve tables at multiple nodes can also degrade database performance, as network communication delays can be incurred during the commit process.

FIG. 3B illustrates the database environment 300 where the tables have been redistributed among the nodes 310, 312, 314 to improve performance of the first query. In particular, tables T1 and T4 have been swapped between the first node 310 and the second node 312, and tables T7 and T9 have been swapped between the second node 312 and the third node 314. In this case, only the second node 312 needs to be accessed to execute the first query, which can greatly reduce its execution time, and can improve use of computing resources.

Of course, changing the locations of tables in order to optimize the first query may cause other queries or database operations to have degraded performance, such as if moving Table T1 to the second node 312 cause a cross node join with table T6 for another query. Thus, it may be difficult to determine how best to place tables in a distributed database system, as well as how and when to replicate or partition database tables.

Other considerations in table placement, partitioning, and replication can include balancing the load between nodes. For example, it may be beneficial to balance one or both of the amount of data stored on a particular node and the frequency with which the data is accessed. That is, generally it is preferable not to have one node hold a significantly larger portion of the data in a database system and have another node hold a significantly smaller portion of the data. Similarly, access requests to the data are also typically considered in placing table at particular nodes, so that nodes do not have disproportionally lower or higher amounts of network traffic, memory use, or processor use than other nodes, at least on average.

Typically, database designers and administrators manually configure table placement, and update table locations during database system operation to attempt to improve performance. Algorithms can also be used to determine database placement, including by testing various placement options and then applying a, typically simulated, workload to each iteration. The results can be analyzed to determine which of the iterations provides the best performance. For example, a number of random placements can be generated and tested. Or, a round robin approach can be used.

However, while the use of round robin and random placement can provide some performance improvement, and save time compared with manual placement determinations, room for further optimization exists. A more complex technique, graph analysis, can be used to help determine how a single table should be partitioned among multiple nodes. However, this technique can suffer from various drawbacks, including assuming tuple-level access operations—e.g., individual tuples are accessed, rather than having entire tables or subtables being accessed in an operation. That is, this technique can fail to properly consider that groups of tuples may be typically accessed in a common operation.

The present disclosure provides a method, and tool, that can be used to generate suggested table placements. The present disclosure also provides for testing a suggested placement to determine that it provides improved performance, including using a captured workload such that performance of the updated table placement can be compared against the performance of the original table placement. In some cases, a method, and a tool using the method, can compare table placement options using a variety of methods to provide one or more table placement options that are expected to provide the best performance.

In a particular implementation, a disclosed method involves algorithmically optimizing a multi-variate objective function that can provide a value that represents a "score" of a given table distribution. The function can include variables that measure performance indicators that can be associated with performance penalties. For example, a function can include variables for performance indicators such as the number of two-phase commit operations that are carried out during a simulated workload, representing the number of distributed transactions that occur in the system with a given table distribution. Another variable can represent the number of multinode queries. Variables can also be provided that represent how well (or poorly) space is distributed in the database system given a particular table distribution (e.g., if the database nodes store similar amounts of data) or how well (or poorly) CPU time is distributed in the database system given a particular table distribution (e.g., if the database nodes perform similar amounts of processing).

The multivariate function can be evaluated by a suitable algorithm, such that a plurality of different table distributions analyzed, with a final, lowest score distribution being provided as the output. Although, in some cases, a larger number of arrangements can be output, optionally with their associated scores. As mentioned above, in some aspects, table distributions for a given database system can be calculated using multiple algorithms, and the lowest score placement (or a list of lowest score placements) provided as output.

In addition to, or instead of, providing a report, a tool accessing an above-described method can automatically redistribute tables in an existing system, or distribute tables in a system being designed (e.g., in a test system that will replace an existing production system).

A variety of optimization techniques can be used, including probabilistic techniques that approximate a global optimum value of the scoring function. Suitable algorithms include stochastic optimization techniques, including Markov chains, such as dual phase evolutionary techniques, for example, simulated annealing. In a particular aspect, at least one probabilistic technique is used. Additional techniques, such as random selection, round robin, or graph-based methods may also be used.

Example 2—Architecture for Database Workload Capture

Figure 4:
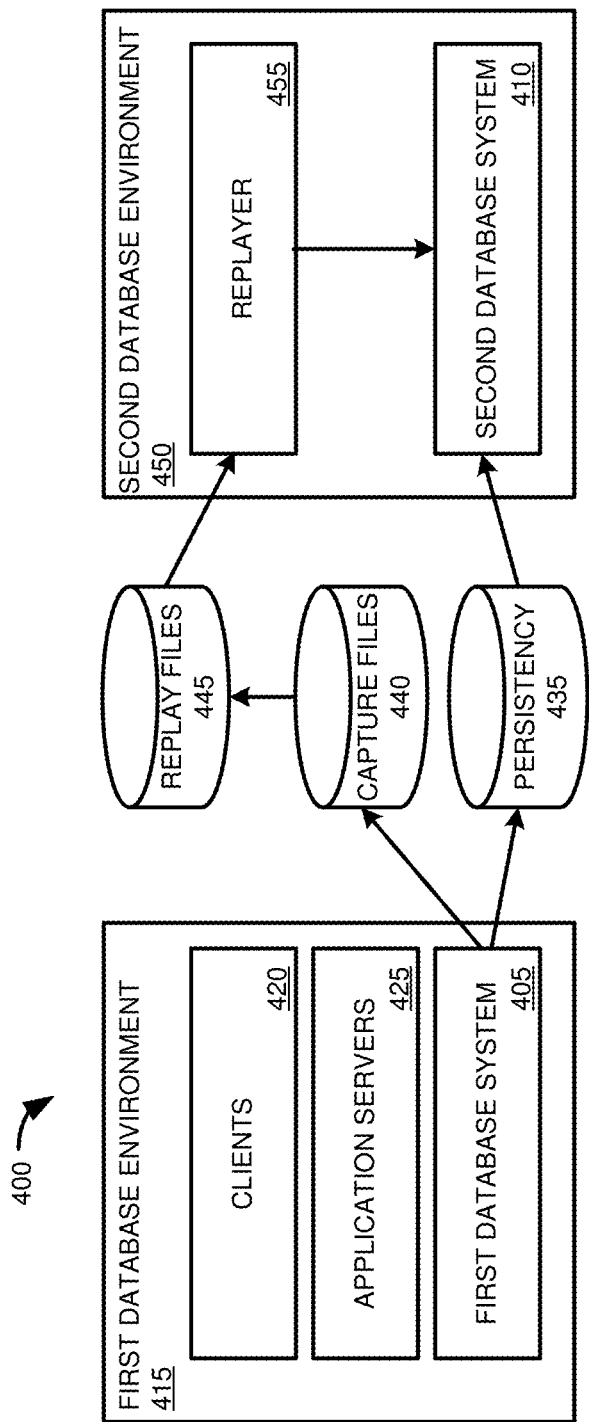
FIG. 4 is a diagram illustrating database environments for capturing a database workload at a first database system and replaying the workload at a second database system.

FIG. 4 provides a diagram of a database environment 400 for comparing the performance of a first database system 405 with a second database system 410. In some cases, the first database system 405 and the second database system 410 use different versions of the same computer program. In other cases, the first database system 405 and the second database system 410 use the same version of the same computer program, but with different settings. In yet further cases, the first database system 405 and the second database system 410 may use different computer programs for implementing a database system. In other cases, workloads can be captured for other purposes, such as for adjusting properties of the first database system 405.

The first database system 405 is part of a first database environment 415. The first database environment 415 can include one or more clients 420 issuing requests for database operations to one or more application servers 425. The one or more application servers 425 can send the requests for database operations to be carried out by the first database system 405.

In carrying out the requests, the first database system 405 can store information regarding the operations in a persistency layer 435. The persistency layer 435 can include, for example, data stored in a persistent, non-transitory computer-readable storage medium. In addition, the first database system 405 can generate information about the requests, which can be stored, such as in one or more capture files 440. The capture files 440 can include information regarding the requests (including the requests), data, including metadata, generated during execution of the request, the results of the requests, and information about the first database environment 415, the clients 420, or the first database system 405. In at least some cases, the capture files 440 can be stored in a compressed format.

In some cases, each capture file 440, or a particular collection of files, includes data associated with, and organized by, a capture unit. The capture unit can be, for example, a session, such as described in Example 1, between a client 420 and the first database system 405 mediated by an application server 425. The session may include one or more requests for database operations, such as one or more statements in a query processing language, such as a query or a transaction. In other cases, the capture files 440, or particular collection of files, represents another processing unit, such as a statement, or a collection of statements over a time period.

The capture files 440 can be processed, such as by the first database system 405, the second database system 410, or another computing system, to produce data, such as replay files 445, suitable for being replayed at a second database environment 450, which includes the second database system 410. The replay files 445 can, for example, decompress information in the capture files 440, or otherwise manipulate the data of the capture files 440 into a form more easily executed at the second database environment 450. In addition to information used for replaying requests for database operations, the capture files 440 can include information that is used to evaluate the performance of the second database system using the captured workload, instead of, or in addition to, being used for replay purposes.

The second database environment 450 can including a replayer component 455. The replayer component 455 may use the replay files 445 to send requests for database operations to the second database system 410 that emulate the requests issued by the clients 420 to the first database system 415.

The system of FIG. 4 can provide a number of advantages. For example, in at least some cases, the capture files 440 can be generated using components of the first database system 405. For example, information in the capture files 440 can include information generated by components of the first database system 405 in carrying out a request for a database operation. The use of existing components, operations, and generated data can reduce the processing load on the first database system 405 in saving a workload, or elements thereof, to be replayed at the second database system 410. In at least some cases, the capture files 440 can include less than all of the information generated during execution of the requests for database operations at the first database system 405, which can also reduce the amount of memory or storage needed to reproduce the workload at the second database system 410. In addition, the conversion of capture files 440 to replay files 445 can be carried out asynchronously and at a different computing system than the first database system 405.

Information included in the capture files 440 can come from one or more sources. In some implementations, capture files 440 can be organized by, or otherwise include data for, capture units, such as database sessions, or another set or subset of requests for database operations. A capture unit, its operations, and data and metadata created during execution of requests for database operations contained in the capture unit (including data returned in response to a query language statement, such as query results), can be associated with a context. In at least some aspects, a context, such as an execution context, is information that describes, or provides details regarding, a particular capture unit, which can be represented by a fact. As described below, the capture unit can be associated with additional facts, such as performance measures.

For example, the session itself may be associated with a session content. The session context can include information such as:

how statements or transactions are committed, such as whether statements are automatically committed after being executed transaction isolation level, such as read committed or repeatable read client geographical location syntax used in the session, such whether strings are null terminated how deferred writing of large objects is carried out a connection identifier a user identifier/user schema an application identifier verbosity settings for logging task execution identifiers debugger information As previously mentioned, elements of a session, such as a transaction, can also be associated with a context. A transaction context can include information such as:

snapshot timestamp (such as used for multi-version concurrency control)

statement sequence number commit ID updates to a transaction identifier

Similarly, when the statement is a query, such as a query having a query execution plan (as described in Example 1), a plan context can include information such as:

query ID/query string query plan compilation time statement hash memory statistics associated with the statement or plan Applications interacting with the database system may be associated with a context. An application context can include information such as:

application name application user name application source code identifier a client identifier location information variable mode (such as whether strings are null terminated)

Along with these various contexts, various values, such as facts or performance measures, associated with a workload capture unit, or an element thereof, may be of interest, and stored in the capture files 440. For example, facts or measures may include:

an identifier, such as a timestamp, associated with the capture unit elapsed time (such as session duration)

processor usage memory usage number of executions carried out number of network calls number of input/output operations any waits encountered while the session was active In some cases, the capture files 440, such as one or more of the contexts and the measure, can include non-deterministic values, such as non-deterministic values associated with a query language statement or its associated operations. Nondeterministic values refer to values that may be different between different computing devices (e.g., different between a database system (or server thereof) where a workload is captured and a database system (or a server thereof) where the workload is replayed. For example, a timestamp function will return a current timestamp value when run on the first database system 405, which may be a different timestamp value than when run at a later time on the second database system 410. Other examples of non-deterministic values include updated database sequence values, generation of random numbers, connection identifiers, and identifiers related to updated transactions.

In particular examples, it can be beneficial to use the same nondeterministic value as used during execution of a request for a database operation at the first database system 405 when the request is carried out at the second database system 410. In implementations where the same value is to be used, the nondeterministic function can be evaluated once (e.g., on the first database system 405) and the resulting value can be provided in the capture files 440 so that when the request (or other workload element) is executed on the second database system 410, the same value will be used (the same value that was used at the workload capture database system).

Although workload capture has been described as occurring with external clients 420, in at least some embodiments, workload capture may also include capture of internal database operations for inclusion in the workload capture files 440. The captured internal operations can be replayed at the second database environment 450. For example, the replay of the captured internal operations at the second database environment 450 may affect the performance of the second database system 410, including the performance of replayed workload elements originating at the clients 420. In other examples, the captured internal operations are not replayed at the replica database system 410, but are used to compare the performance of the first database system 405 with the performance of the second database system 410. For example, the performance comparison can include comparing a number of internal operations generated by the workload at the first database system 405 with a number of internal operations generated by the second database system 410.

In some cases, the internal operations may be triggered by a user. In other cases, the internal operations occur automatically during operation of the database system. For example, with reference to FIG. 2, periodically, the state (such as changed records and redo logs) of the database server 206 can be written as persisted data 272 by the persistence layer 268, such as to create a save point. Save points, in some examples, may be requested by a user. In other examples, save points may occur automatically, such as according to a schedule, when a threshold number of records have been changed, or when a threshold number of requests for database operations have been received or executed. Similarly, storage snapshots, file system backups, data backups, and log backup operations can be captured and, optionally, replayed.

Changes to database records, such as records in the column store 264, can, in some examples, be written to temporary copies of the database records. Periodically, the changes reflected in the temporary copies can be merged into the source database records. Making changes to temporary copies can improve the performance of write operations, including concurrent write operations. The temporary copies can, for example, be maintained in an uncompressed state, or a state with reduced compression, compared with the primary database records. Merge operations can be captured and included in the capture files 440.

Internal operations can also include housekeeping operations. For example, in some cases, the first database system 405 can have recent or often-used data in-memory, and older, or less commonly used, data can be stored in persistent storage, such as persistent storage 435 or another persistent storage. The capture files 440 can store information regarding the transfer of data between persistent storage and memory.

The capture files 440 may include all or a portion of these contexts, context elements or values, facts, and measures. In addition, the capture files 440 can include additional information, such as information that may be of assistance in replaying the workload at the second database system 410 or in evaluating the performance of the execution of the workload at the first database system 405, such as nondeterministic values.

In at least some implementations, the volume of information that can be collected for a workload can be large. In at least some cases, the volume of information can be reduced by only including a portion of the information, such as a portion of the context information, in the capture files 440. In addition, to assist with organization and compression of the information, in some implementations, the information can be organized in a schema or a dimensional model, such as a star schema. For example, the measures and facts can be used as the central fact table or tables, which reference as points one or more dimensions, each dimension including one or more contexts. In a particular implementation, each point represents a discrete context, and, in addition to any facts or measures, the fact table includes identifiers for corresponding information in the dimensions.

Figure 5:
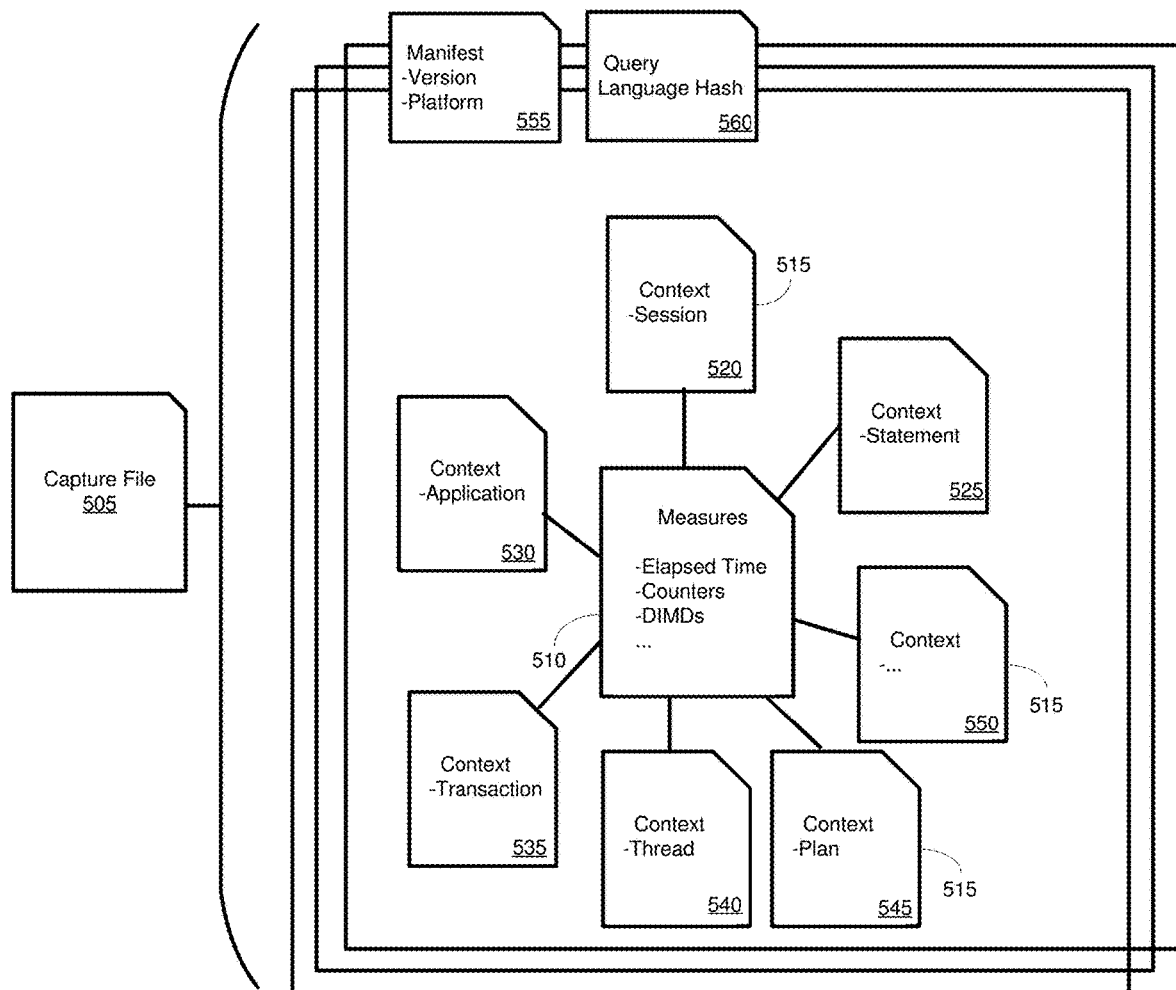
FIG. 5 is a diagram of a workload capture file schema for storing execution context data and performance data.

An example of this schema is shown in FIG. 5. FIG. 5 illustrates a capture file 505 that includes a fact table 510 correlated with a plurality of dimensions 515 associated with the fact table 510. Specifically, the fact table 510 is shown as associated with dimensions 515 representing contexts for a session 520, a statement 525, an application 530, a transaction 535, a thread 540, a plan (such as a query execution plan) 545, and other parameters 550. The fact table 510 includes various measures, such as elapsed time and any counters associated with the capture unit associated with the capture file 440 or collection of capture files (such as a session). The fact table 510 also includes dimension IDs (DIMIDs) used to correlate entries in the fact table 510 with each of the dimensional contexts 520, 525, 530, 535, 540, 545, 550. Although a single fact table 510 is shown, in some implementations, multiple fact tables 510 may be used.

The fact table 510 (or tables) and the dimension tables 515 can include records for a plurality of capture units (such as sessions) of the first database system 405. In some cases, the fact table (or tables) 510 and each of the dimension tables 515 can be stored as separate files. That is, there may be one file for the fact table 510 (when a single fact table is used) and one file for each of the dimension tables 515. In a particular example, the capture file 505 can incorporate the files for the fact table 510 and the files for each of the dimension tables 515. In some cases, the capture file 505 can be compressed, such as using a compression algorithm. Similarly, files for one or more of the fact tables 510 and the dimension tables 515 can be compressed. In implementations where a database system from which a workload is captured includes more than one server or node, the capture file 505 can, in some aspects, represent activity occurring at a single node of the first database system 405 of FIG. 4. In other aspects, the capture file 505 can be associated with multiple nodes of the first database system 405.

The capture file 505 can include additional information. For example, the capture file 505 is shown as including manifest information 555. Manifest information 555 can include, for example, information related to the first database system 405, such as an identifier for the program version used to implement the first database system 405 and information relating to the computing system used to implement the first database system 405 (such as the number and type of processors, amount and organization of memory and physical storage, information related to networked devices implementing the first database system, or configuration information for the first database system 405 or its components). The manifest information 555 can also include a timestamp associated with the capture file 505 (such as a time the capture file was generated, a time the workload capture was initiated, or a time the workload capture was discontinued). When filters were used to select workload elements to capture, the filter information can also be included in the manifest information 555. When used to store information related to multiple database nodes, the fact table 510 or dimension tables 515 can include information regarding which of the multiple database nodes was involved in executing operations of the workload capture unit, or a subcomponent thereof (such as in executing a statement associated with a particular session). In a particular example, the manifest information 555 can be stored in a file, such as a compressed file, and included within the capture file 505.

The capture file 505 can also include hash information 560. For example, query language statements in the fact table 510 or the dimension tables 515 can be represented by a hash. The hash information 560 can include a hash table correlating hash values to query language statements. By only storing the hash value of the query language statement in the measure file 510 or one or more of the context files 515, the amount of memory needed to store the workload capture can be reduced.

In particular examples, the fact table 510 and the dimension or context tables 515 can be stored as files, and the fact or dimension files grouped together in the context file 505, optionally including a file for the manifest information 555 or a file for the hash information 560. In a particular example, each of the context tables 515 is stored as a separate file within the capture file 505. Each of the capture files can include a dimension identifier (DIMID) field, and one or more value fields. In a specific example, the values can be written in comma separated value format. Similarly, each measure can be stored as a separate file within the capture file 505. Each of the measure files can include a chronological identifier, such as a clock timestamp (such as for the overall database system from which the workload was captured). The chronological identifier can be used, for example, in staging replay of the capture units (such as sessions) represented in the capture file 505. The measure file can also include multiple DIMID fields to associate measures for a particular workload capture unit with its associated dimensions, and one or more numerical fields (such as performance or execution parameters or values). In particular examples, the DIMID or numerical fields can be written in comma separated value format.

In some cases, context files and one or more measure files can be stored for each of a plurality of services in a database system. The set of context files and one or more measure files for each of the services can be included in the capture file 505 (which, in at least some examples, represents a single database server or node, such as when the database system is distributed among multiple servers or nodes). For example, a database system can have separate services that include query language processing components and data stores, that produce information regarding the distribution of information (including database records) and database system components in the database system, that are responsible for handling certain types of client communications, such as web or http-based interactions, that manage various memory stores (such as transferring data between persistent storage and in-memory storage), and that monitor resource (such as CPU or memory) use in the database system (including across multiple database servers, when the database system is a distributed system).

Figure 6:
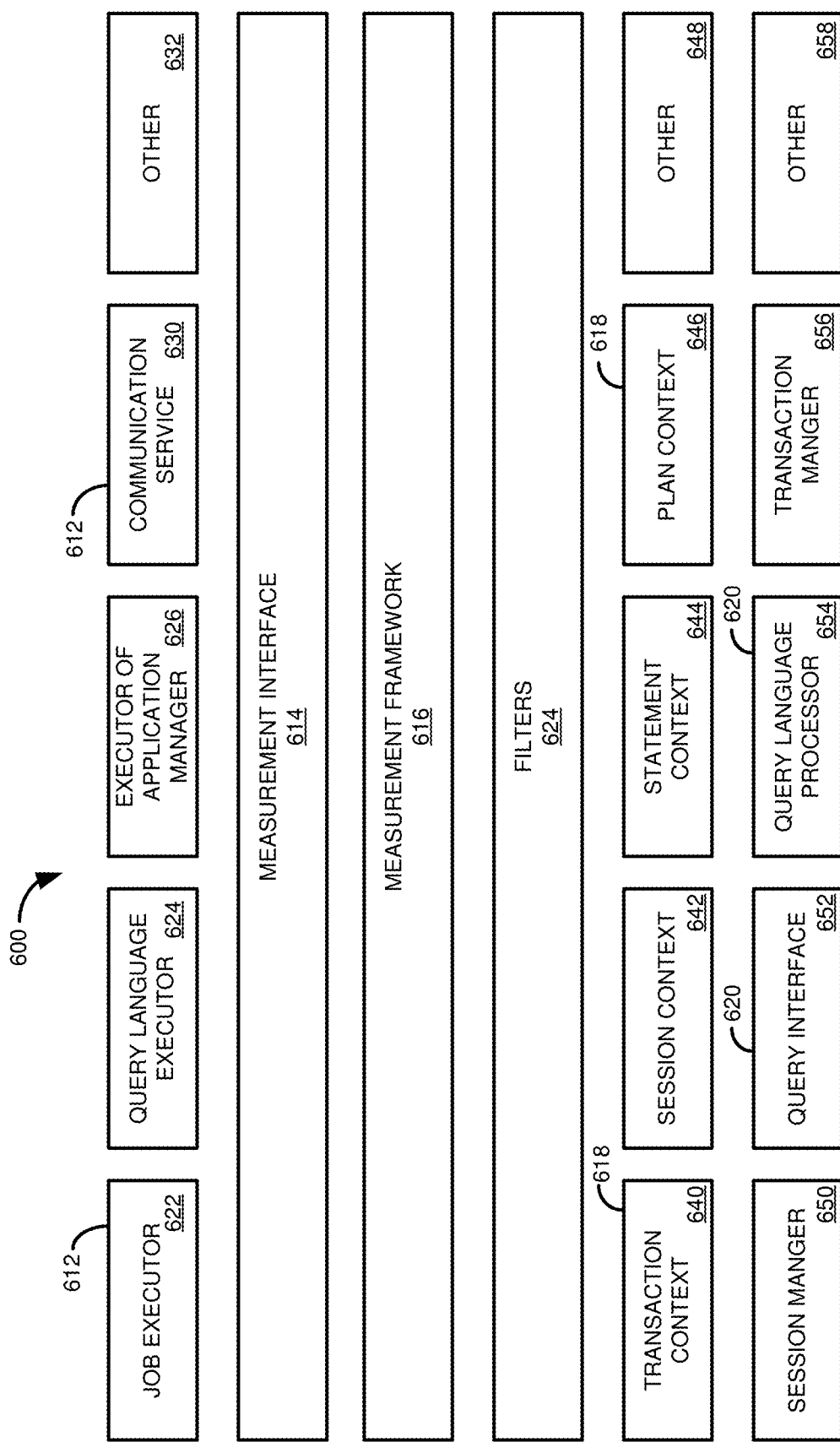
FIG. 6 is a block diagram of an example software architecture for implementing workload capture according to an embodiment of the present disclosure.

FIG. 6 illustrates components of a database environment 600 that can be used to measure and collect workload capture information to be stored, such as in the capture file 505 of FIG. 5. In at least some cases, the measuring and collecting can be carried out by existing components of a database system. For example, the measuring and collecting can be carried out during normal processing of requests for database operations. In this way, the overhead (such as processor load and delay) associated with the capture process can be reduced.

As shown in FIG. 6, the database environment 600 includes measuring (or execution) components 612, a measurement interface 614, a measurement framework 616, contexts 618, and context management components 620. Each of the measuring components 612 can be responsible for executing various processes associated with a request for a database operation. The measuring components 612 can provide measures or facts associated with a request for a database operation. In some cases, in executing the requests, the measuring components 612 can generate data about the execution of the request, or used in carrying out the request. For example, the measuring components 612 can generate performance information associated with execution of the request.

The measuring components 612 can be registered with the measurement framework 616 using the measurement interface 614. The measurement framework 616 can collect information generated by, or otherwise associated with, the measuring components 612. The measurement framework 616, optionally in conjunction with one or more additional components, can be responsible for generating the capture file 505 of FIG. 5, including the dimension or context tables 515, the fact table or tables 510, the manifest information 555, and the query language hash file 560. In at least some cases, the use of multiple fact or context tables or files allows multiple tables or files to be written in parallel, which can speed the workload capture process.

As discussed above, in at least some implementations, the contexts 618 may include more information than may be needed to replay the requests for database operations in a second database environment, or to compare the performance of the first database system with a second database system. In such cases, a filter layer 624 can be included between the measurement framework 616 and the contexts 618 associated with the measuring components 612. The filter layer 624 can be configured to pass selected information from contexts 618 to the measurement framework 616.

The contexts 618 can be managed, or used, by the context management components 620. In addition, the context management components 620 can be used to provide information to the contexts 618 or to the measuring components 612. In some cases, the context management components 620 can be responsible for information in a context 618 related to dimensional data associated with the context.

Measuring components 612 can include a job executor 622, a query language executor 624, an executor for an application manager 626, a communication service 630, and other components 632 (such as components executing internal database operations, such as merge and savepoint operations). Contexts 618 can include a transaction context 640, a session context 642, a statement context 644, a plan context 646, and other contexts 648 (such as contexts associated with internal database operations). Context management components 620 can include a session manager 650, a query interface 652, a query language processor 654, a transaction manger 656, and others 658 (such as a component managing a context for an internal database operation).

As an example, one context management component 620 can be the session manager component 650, such as the session manager 208 of FIG. 2. The session manager component 650 can coordinate particular sessions, including requests for database operations associated with the sessions. The session manager component 650 can, for example, store information associated with a session in the session context 642. The session context 642 can include values for the parameters identified for the session context table 520 of FIG. 5.

Another of the contexts 618 can be a plan context 646. The plan context 646 can include values for parameters such as described above for the plan context table 545 of FIG. 5. The plan context 646 can, in some cases, be managed by the query language processor 654, such as the query language processor 216 of FIG. 2. The query language processor 654 can also manage a statement context 644. The statement context 644 can include values for parameters such as allowed memory usage, allowed CPU usage, number of allowed parallel threads, priority, user ID, and a sequence identifier.

For a particular capture unit, the measurement framework 616 can aggregate facts and measures, such as performance measures, generated by the measuring units 612 and associate them with the corresponding contexts 618 for the capture unit. The aggregated facts and measures, and the corresponding context information, can be stored in a capture file, such as the capture file 505 using the schema of FIG. 5.

Figure 7:
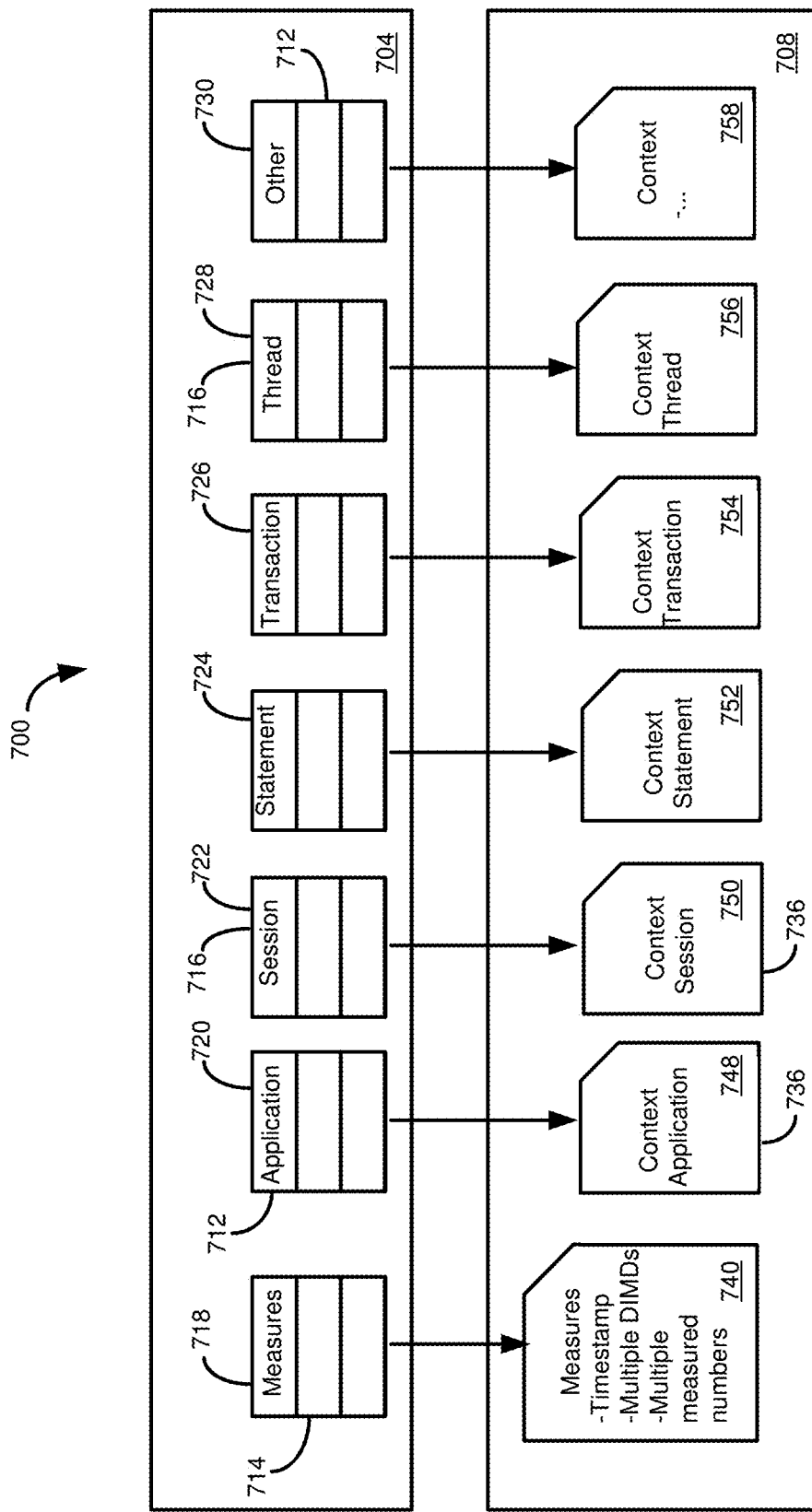
FIG. 7 is a diagram depicting storing, such as writing to a plurality of files, of buffered workload capture data according to an embodiment of the present disclosure.

FIG. 7 illustrates a database environment 700 depicting a process for storing information from a measurement framework 704 in a capture file 708, such as capture file 505 using the schema of FIG. 5. For each of a plurality of capture units, the measurement framework 704 can store a mapping of facts and measurements associated with the capture unit with the corresponding context information. In particular examples, the mapping can be stored in memory, such as in buffers 712 for each of a plurality of contexts and a buffer 714 for measures 718 associated with capture units. FIG. 7 illustrates buffers 712 for contexts 716, including an application context 720, a session context 722, a statement context 724, a transaction context 726, a thread context 728, and, optionally, other contexts 730.

The buffers 712 can be written to the schema of the capture file 708. In some cases, the buffers 712 can be written to separate files 736 for each of the contexts 716, such as files for context data for an application 748, a session 750, a statement 752, a transaction 754, threads 756, and, optionally, other context information 758. The buffer 714 can be written to a measure file 740. The data in the buffers 712, 714 can be compressed prior to being written.

Although a single buffer 714 and a single measure file 740 are shown for the measures 718, in other cases, multiple buffers 714 or files 740 can be used. For example, multiple buffers 714 can be used when the capture file 704 includes multiple measure files 740, or information from multiple buffers 714, such as buffers representing different measures or facts, can be aggregated into one or more measure files 740. The measure file 740 can store information for one or more capture units, including an identifier, one or more facts or measures, and identifiers for context information stored in the context files 736.

In some cases, the buffers 712, 714 may be written to their corresponding files 736, 740 when a workload capture is completed. In other cases, the buffers 712, 714 can be written periodically during workload capture. For example, each of the buffers 712 and the buffer 714 can be assigned a threshold size. If a particular buffer of the buffers 712, or the buffer 714, exceeds the threshold, the buffer can be written to its corresponding file 736, 740 and emptied. In other cases, the buffers 712, 714 can be written periodically in another manner, such as at particular time intervals or after a particular number of capture units have been added to the buffers. When the workload capture process has been completed, the files 736, 740 can be combined, such into the capture file 505 of FIG. 5. In particular examples, the files 736, 740 can be compressed as they are combined.

The database environment 700 may be implemented in a different manner. In a particular implementation, rather than a single buffer for each of the contexts 716 and the buffer 714 for the measures 718, the database environment can include multiple buffers. For example, two (or more) buffers can be included for each of the contexts 716 and for the measures 718. Data can be written to the first buffers until a buffer is filled, at which time it can be written to a file as described above. During the writing process, information can be stored in the second buffer, which is then written when filled, and new data stored in the first, now empty, buffer. Also, rather than having separate buffers for each of the contexts 716 and the measures 718, the contexts and/or measures may be stored in a common buffer. When filled, the buffer can be written to respective context and measure files 736, 740. The environment 700 can include one or more additional common buffers to be used when a first common buffer is being written.

Figure 8:
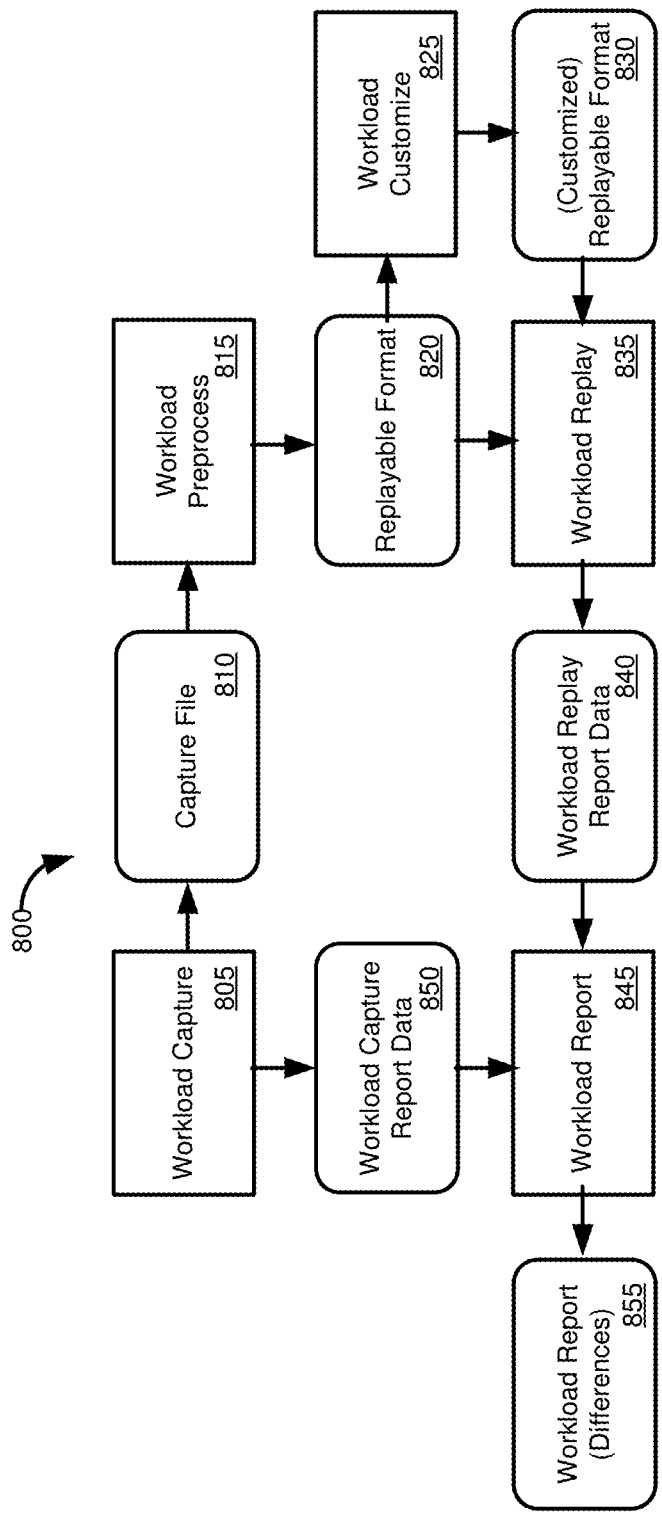
FIG. 8 is a diagram illustrating a method for comparing the performance of a first database system with a second database system.

FIG. 8 is a diagram of a process 800 for comparing performance statistics of a workload executed at a first database environment with performance statistics of the workload executed at a second database environment. In step 805, a workload, such as one or more requests for database operations (which may be associated with one or more database sessions) is captured at a source system, such as described in conjunction with FIGS. 2 and 4-7. The capture process 805 generates a capture file 810, such as a capture file having the structure of the capture file 505 of FIG. 5.

The capture file 810 is processed in process 815 to produce captured requests for database operations and associated data in a replayable format 820. The processing in step 815 can include extracting or decompressing individual context and measure files from the workload capture file 810. If the individual context and measure files were compressed, they can also be extracted or decompressed.

During step 815, individual capture units, such as sessions, and/or subcomponents thereof (e.g., statements) can be reconstructed from the context and measure files. For a particular measure, relevant context information can be retrieved based on dimension or context identifiers stored with the measure. For example, statements in a session can be associated with corresponding context information, such as a query language statement and context information (or triggers to generate the context information) that would have been received by the database system from which the workload was captured.

In some cases, the capture units, and operations within the capture units, can be ordered during the processing step 815. For example, the capture units, or operations, can be ordered chronologically using a time associated with the capture units or operations (e.g. a system timestamp, commit timestamp, or other identifier). In other cases, the capture units are reconstructed during processing step 815, but are not ordered. Ordering can occur, for example, during replay of the replayable format 820.

In particular examples, the replayable format 820 can be a replay file, such as a file stored on a hard disc or other persistent storage medium or non-volatile memory. In other examples, the replayable format 820 can be stored in a different manner, such as in volatile memory. While in some cases the replayable format 820 may be a single store or file, in other cases information in the repayable format 820 can be included in multiple stores or files.

The replayable format 820, including a replay file, can include information regarding the workload capture process and workload capture system, such as a database software version associated with the source data system, information regarding the configuration (including processors and available memory) of the source database system, and start and end times for the workload capture. The replayable format 820 can also include information regarding any filters applied to workload elements being captured, such as workload elements associated with particular applications, users, clients, statement types, or elements exceeding a threshold duration. Statistics regarding the capture process, such as the number of capture units (e.g., sessions), statements, and/or committed transactions recorded in the capture file 810 can also be stored in the replayable format 820. The replayable format 820 can further include information regarding the processing step 815, such as a software version associated with a processing component generating the replayable format, information about a computing system used to carrying out the processing step, and start and end times for the processing.

The replayable format 820 can include additional information. For example, information can be included regarding database users, such as information that would have been transmitted to the source database system when the workload was generated. Information regarding query language elements can be included in the replayable format 820, such as codes for DDL (data definition language), DML (data manipulation language, e.g., SELECT, UPDATE), and DCL (data control language) operations. The replayable format 820 can also include information regarding query language statement strings, such relating an identifier (such as a hash value) to a particular query language statement string.

Other types of information that can be included in the replayable format 820 include information regarding the number of batch updates at the source database system during workload capture, values of nondeterministic functions, and information regarding nested statement in workload capture units, or elements thereof (such as in CALL statements). Hash value results, such as those used to verify consistent execution between the source database system and the second database system can be included in the replayable format 820.

The replayable format 820 can also include information, including in individual files, related to individual capture units, such as database sessions. Information for the capture units can include connection identifiers, information regarding the capture unit, or suboperations thereof, such as a start time for a request, a request type, and context information associated with the request. Parameters, such as measures, associated with the capture unit can be included in the replayable format 820. The replayable format 820 can also include identifier information for the capture unit, such as a session ID, a user name, a particular schema associated with the user, etc.

In optional process 825, the captured workload in the replayable format 820 can be customized to produce a customized captured workload in a replayable format 830. For example, process 825 can include selecting particular users, clients, applications, sessions, etc. associated with the first database environment to be replayed at the second database environment. The process 825 can also include extracting read and write operations, including read and write operations that are associated with particular transactions.

A user may also select particular segments of a captured workload to be replayed, rather than replaying an entire workload, or can merge multiple workloads (or segments thereof) to be replayed, such as simultaneously or sequentially. In some aspects, a user can also select the speed at which the workload should be replayed. That is, in some cases, requests for database operations can be replayed with the same time interval experienced at the source system. In other cases, the user can select the workload to be replayed in another manner, such as increasing or decreasing the replay speed versus the speed database operations were carried out at the source database system.

In process 835, the captured workload in the replayable format 820, or the customized workload in replayable format 830, is replayed at the second database environment. The replay 835 can include reading information associated with individual capture units, or operations thereof, from the replayable format 820, 830. In some cases, the information can be read sequentially from the replayable format 820, 830. In other cases, a replayer component can select capture units, or operations thereof, to be replayed in a particular order. For example, the replayer may select capture units, or operations, in the replayable format 820, 830 to be replayed based on order in which the capture units or operations were received by the source database system, such as a chronological order. The chronological order can be determined, for example, using an identifier (e.g., a system timestamp, a commit timestamp, or other identifier).

In at least come cases, the replayer cause multiple capture units, or operations, to be sent to, or replayed at, the second database system. In particular implementations, workload elements received by the second database system, to be replayed, can be received in a format analogous to the format in which they were received by the source database system. That is, the replay information can resemble requests for database operations produced by an external database client (or by internal database operations of the source database system). The replay 835 produces an output 840, such as workload replay report data, that includes performance measures associated with the execution of the workload at the second database environment.

A workload report process 845 can be carried out, such as comparing workload replay report data with workload capture report data 850, such as data including performance measures associated with the execution of the workload at the first database environment, such as performance measures associated with the capture file 810, the workload in the replayable format 820, or the workload in the customized workload replayable format 830. In at least some implementations, one or both of the workload capture report data 850 and the workload replay report data 840 can be structured as, or include information in, the capture file 505 of FIG. 5.

The workload report process 845 can produce a workload report 855, such as a report comparing execution of the workload at the first database environment with execution at the second database environment. For example, the workload report can include information regarding processor usage, wait times (such as average execution time), query language statement throughput (such as the number of executed statements), number of connections with other database servers or other components, query performance, comparisons of query results or query plans between two database systems, candidate and execution locations of statements, and information regarding the consistency of tables between the two database environments.

The workload report 855 can include information comparing and summarizing the performance of the entire workload replay, or individual elements of the workload replay. For example, the report 855 can provide information comparing the execution of particular capture units, or particular operations within a capture unit. In a particular example, the report 855 is stored as database records or is derived from database records, such as in an OLAP cube. According to a disclosed embodiment, the workload report 855 can provide information regarding the score associated with a current table distribution, and can compare that score with other table distributions, such as a prior distribution or an alternative distribution. The score can provide a measure of how efficient the table distribution may be.

Figure 9:
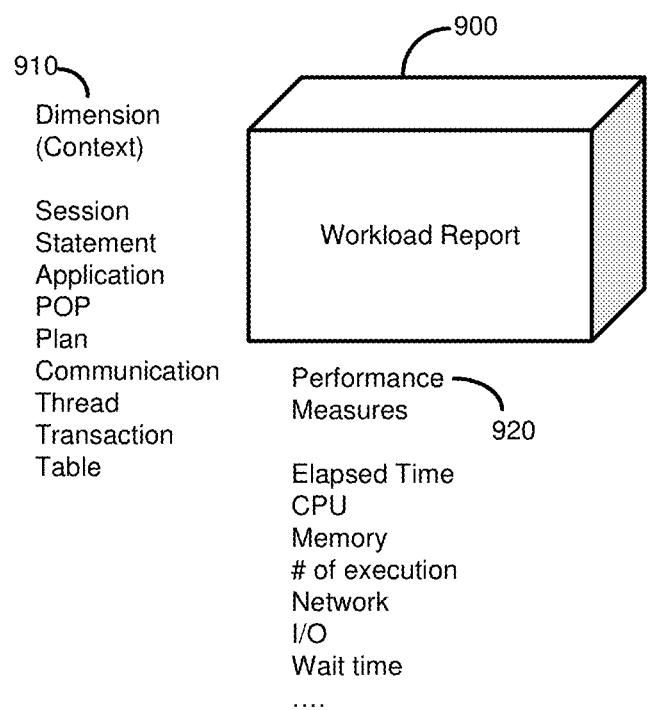
FIG. 9 is a diagram depicting an OLAP cube of workload report useable to compare the performance of a first database system with a second database system according to an embodiment of the present disclosure.

FIG. 9 illustrates an OLAP cube 900, and dimensions 910 and measures 920 that can be included in the cube. In some cases, the OLAP cube 900 can be a hypercube, having more than three dimensions 910.

Example 3—Example Table Distribution Optimizer

Figure 10:
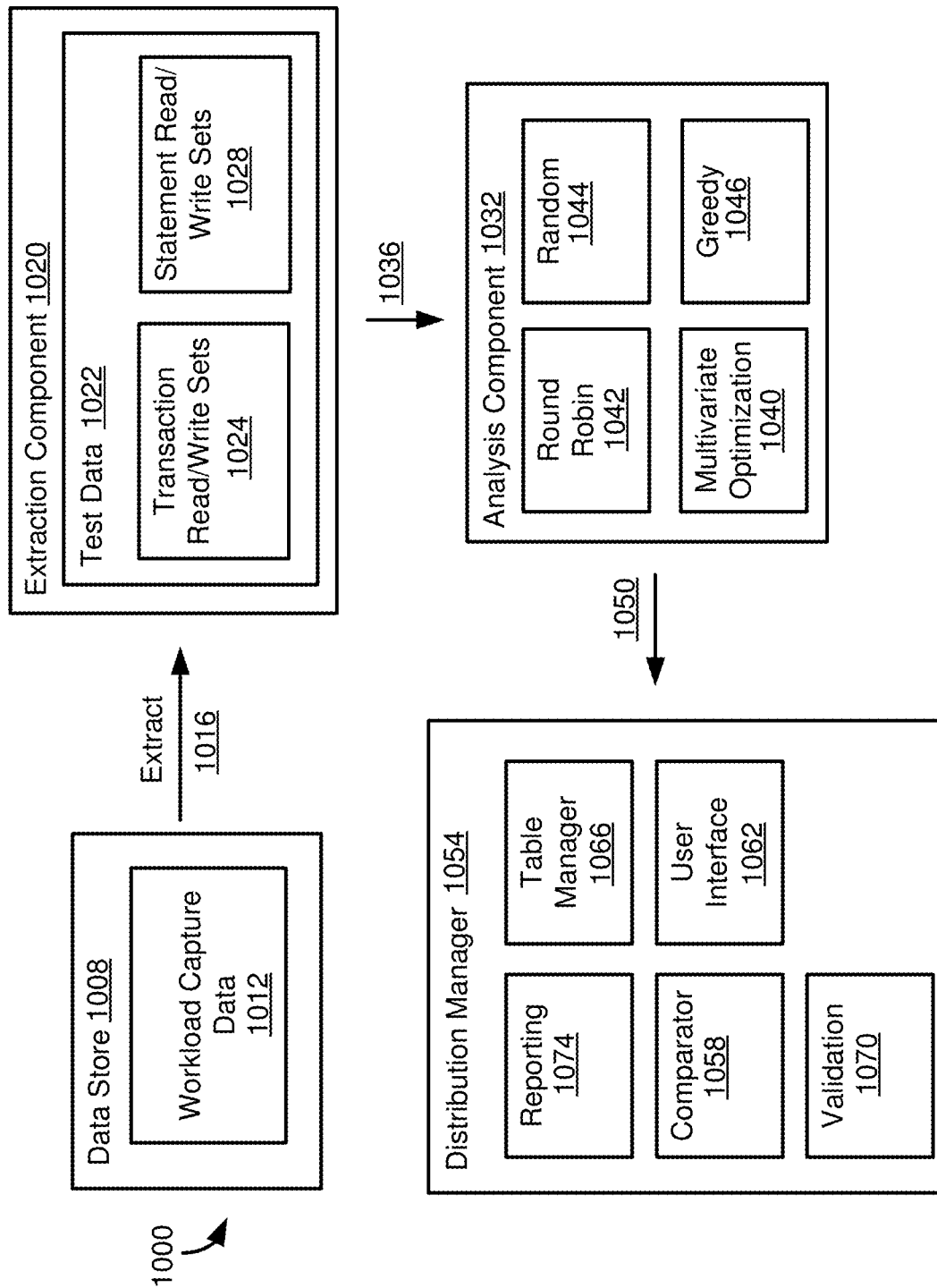
FIG. 10 is a schematic diagram of an example architecture for determining improved table placements in a distributed database environment.

FIG. 10 illustrates an example database environment 1000 in which at least certain disclosed technologies providing for improved table placement can be implemented. The database environment 1000 includes a data store or source 1008 that includes workload capture data 1012. The workload capture data 1012 can include all or a portion of workload capture data described in Examples 1-2. Similarly, the workload capture data 1012 can be captured using capture techniques described in Example 1-2. In further examples, the workload capture data 1012 can include other types of data or can be captured in other manners. Additional details of workload capture data and techniques are discussed in U.S. patent application Ser. Nos. 15/150,075 and 15/202, 366, incorporated by reference herein in their entireties.

The workload capture data 1012 typically includes information regarding DML (data manipulation language) statements, and optionally information regarding other types of statements, including DDL (data definition language) statements, DCL (data control language) statements, and TCL (transaction control language) statements. In a process 1016, an extraction component 1020 extracts test data 1022, which can include transaction read/write sets 1024 and statement read/write sets 1028 from the workload capture data 1012.

In some cases, the data for the read and write sets 1024, 1028 can be maintained in the same form as it is maintained in the workload capture data 1012. In other cases, the data for the read and write sets 1024, 1028 can be extracted from the workload capture data 1012, and optionally reformatted. For example, captured queries and captured statements (e.g., statements in query language, such as the structured query language) and transactions that include data manipulation operations (e.g., insert, update, and delete operations) can be analyzed to extract individual read and write operations. Statements in particular transactions can be identified, for example, by reading a commit log or other captured information that defines a transaction scope (e.g., begin and commit statements).

The read and write sets 1024, 1028 can be provided to an analysis component 1032 in a process 1036. The analysis component 1032 can include, or can call or otherwise access, one or more analysis methods. The analysis methods include at least one multivariate optimization method 1040. The analysis component 1032 can optionally include additional analysis methods, including one or more of a round robin method 1042, a random selection or placement method 1044, and a greedy method 1046. The analysis component 1032 can include other types of methods to place tables and determine a score associated with a particular table placement distribution or scenario.

The round robin method 1042 can place tables sequentially at different nodes. For example, in a three node system, Table 1 can be assigned to Node 1, Table 2 can be assigned to Node 2, Table 3 can be assigned to Node 3, and then the process can repeat, with Table 4 being assigned to Node 1, Table 5 to Node 2, Table 6 to Node 4, Table 7 to Node 1, and so on. In some cases, the round robin method 1042 can place tables in an order for distribution so as to improve system balancing, such as ordering tables by size so that, for example, large tables are less likely to be inadvertently disproportionally distributed to a single node. Or, an order can take into access other or multiple factors, including how frequently tables are accessed. In further cases, the order in which tables are to be distributed can be randomized. The round robin method 1042 can be carried out multiple times, and the lowest score distribution selected.

The random method 1044 randomly places tables at different nodes. Like the other methods 1040, 1042, 1046, the random method 1044 can be carried out multiple times and one or more lowest score table distributions can optionally be selected for further use or analysis.

The greedy method 1046 can iteratively generate table distributions and move to the new distribution as the basis for further iteration if the new distribution has a lower score than the starting distribution. Otherwise, another iteration of the starting distribution is tested if the prior new distribution has a higher score than the starting distribution. In some cases, table placement can also be carried out using a greedy method. For example, a table can be moved from a node with higher computing resource use to a node with lower computing resource use. Thus, for example, the greedy method 1046 can generate iterations in a greedy manner, and can choose whether to accept an iteration in a greedy manner. In other cases, the iterations can be generated in another manner, including by sequentially moving tables between nodes, moving tables in a round robin manner, randomly moving tables, or by generating table distribution iterations in another manner.

The multivariate optimization method 1040 can operate by seeking to minimize a scoring function, such as an objective scoring function. In some cases, such a function can also be used to evaluate scores with the greedy algorithm during distribution determination, and to determine final scores of all methods. For example, the multivariate optimization method 1040 can iteratively analyze table placement scenarios, calculate a score of a particular scenario, and select, manipulate, or reject scenarios based on score.

In some cases, the multivariate optimization method 1040 is carried out until an optimal value is determined using the method (e.g., the method is carried out until all iterations have been analyzed or no lower score distribution can be determined). In other cases, the optimization method 1040 is carried out for a fixed amount of time, or the parameters for the optimization method 1040 are selected such that the optimization method 1040 will run for a fixed or bounded time period (such as by selecting the number of iterations that will be analyzed, or criteria that influence the number of iterations that will be analyzed). In further cases, the multivariate optimization method 1040 is carried out until a stopping criteria is met other than number of iterations or running time. For example, the analysis can be carried out until a particular score threshold is met (e.g., a calculated score being less than a threshold score) or until the difference between two or more iterations meets a particular threshold (e.g., the score difference between a group of iterations is less than, or less than or equal to a certain amount, or the analysis continues as long as the difference exceeds, or is the same as or greater than, a threshold amount).

The multivariate optimization method 1040 includes a plurality of variables that measure the score of a particular table placement distribution or scenario. At least one, and typically a plurality, of the variables reflect penalties that are incurred by having database operations access multiple tables that are spread across different nodes as opposed to having the multiple tables on a single node (or a smaller number of nodes, or another arrangement that gives rise to the measured scores, which could include penalties incurred by hosting tables on a node that has less available computing resources, such as processor availability, or hosting tables on nodes that have slower response times, such as slower or more remote network connections).

One parameter, or performance indicator, that can reflect system performance issues resulting from or associated with table distribution in a distributed system is the number of two-phase commit operations that would be expected. In a typical two-phase commit process, operations associated with a transaction are associated with multiple nodes. A coordinator node coordinates the commit of the transaction with any slave nodes involved in the transaction. Typically, multiple network communications are used for the two-phase commit process, which can delay the commit process and can increase resource use and increase the potential for congestion (and, in some cases, for other performance issues, such as deadlocks, to arise). Thus, a higher number of two-phase commit operations is typically associated with a greater score for the particular table distribution scenario.

The multivariate optimization method 1040 will typically try to minimize the number of two-phase commit operations, balancing the reduction in that metric against possible increases in other metrics used in the scoring function.

Another parameter, or performance indicator, that can reflect system performance issues resulting from table distribution in a distributed system is the number of multinode queries, where the query retrieves data from multiple nodes. A multinode query can include, for example, join or union operations. Or, a multinode query can involve retrieving data from one or more tables that are partitioned between different nodes.

Multinode queries can incur additional penalties, such as networking delays, by requiring that data be transmitted from a first node holding data for a join to a second node holding data the join and performing join calculations. Additional penalties can also be incurred in union operations that do not necessarily require internode communication, such as penalties in establishing communications between a client and multiple nodes. Penalties can also be incurred if a query or other operation requires multiple nodes to service a single request, thus spreading CPU and network use, such as reducing a number of available processing threads and network sockets at multiple nodes rather than connecting to a single node. The multivariate optimization method 1040 will typically try to minimize the number of multinode queries, balancing that reduction against possible increases in other metrics used in the scoring function.

As touched on above, how data and computing resource use is spread across a distributed database system can be a performance measure that can be relevant to a score of a particular table distribution scenario. Thus, metrics that reflect the evenness, or skew, of computing resource use over the database system can be included in a scoring function used with the multivariate optimization method 1040. In some cases, the distribution can be measured as the standard deviation of the computing resource use across the database nodes.

One particular metric is a space use distribution value. The space use distribution value can be calculated as various values. According to one approach, the space use distribution value is calculated as the standard deviation of per-node space consumption (which can be memory consumption or secondary storage consumption) resulting from tables or subtables (e.g., partitions) stored on the node and associated with the relevant database system. That is, if a node was shared between database systems, tables for a second database system may, at least in some cases, be omitted from the standard deviation calculation. In other cases space consumption distribution can be analyzed without considering with which database system a table or subtable on a node is associated. Typically, the multivariate optimization method 1040 will try to minimize the standard deviation of space consumption, balancing that reduction against possible increases in other metrics used in the scoring function.

Another metric that reflects computing resource distribution is the amount of processor time (e.g., CPU time) used by nodes in the database system. The processor time distribution can be calculated as various values. According to one approach, the processor time distribution is calculated as the standard deviation of per-node CPU time consumption resulting from queries (or other DML operations) executed at the nodes. Typically, the multivariate optimization method 1040 will try to minimize the standard deviation of processor time distribution, balancing that reduction against possible increase in other metrics used in the scoring function.

In some aspects, the processor time can be based on execution parameters of database operations, such as SELECT or UPDATE statements. Processor time use can be captured during execution of the operations on a source database system, such as being included in the capture file 505 of FIG. 5. If the database operations access a single table, for a score calculation of a particular table distribution, the CPU penalty can be added to the scores associated with the node hosting the table in that distribution.

If the operations access multiple tables, multiple table partitions, or a combination therefor, that are hosted on different nodes in a particular table distribution, the CPU penalties can be divided among the different nodes, including distributing the penalties evenly or using a weighting (such as based on a number of tuples processed on particular sub-tables, or using weighting values associated with different operator complexities). In other cases, performance metrics captured along with database operations (e.g., queries or other query language statements) for multi-tables can track processor use at a finer granularity than the overall operation. That is, for example, captured performance metrics can include processor use data for individual tables or partitions. The processor use information can then be distributed to the table scores of the nodes hosting the respective tables in a particular table distribution being evaluated, in a similar manner as for single-table operations.

In some cases, however, such as when a final table distribution is being evaluated, processor use can be measured by actually replaying a captured workload, rather than distributing previously stored values. In other words, stored, historical data, can be used for determining an optimized distribution, and then actual CPU use can be measured by replaying a workload on a database system configured according to the optimized distribution. Although the above discussion involved processor use score, other performance metrics, such as memory use or network use during the execution of database operations, can be included in a scoring function in an analogous manner.

Other metrics can be used in a scoring function, including in addition to, or in place of, the metrics discussed above. For example, the distribution, such as the standard deviation, of memory use can be included in the scoring function. The distribution of various single-node operations can be included in a scoring function, such as including one or more of a number of client requests, network IO requests, persistence operations, single-node commit operations, and single-node queries. In some aspects, the distribution can be reflected as the standard deviation of one of these metrics. Typically, the multivariate optimization method will try to minimize the standard deviation (or otherwise provide a more balanced distribution) of these parameters, balancing that reduction against possible increases in other metrics used in the scoring function.

A scoring function, or metrics, may be used in multiple ways. For example, certain metrics can be used to evaluate a scoring function during distribution determination, such as determining the score values associated with read/write operations. In some aspects, the penalties incurred in read/write operations include those that can be determined directly from the operations, such as a number of two-phase commit operations or number of multi-node queries. Other, or additional, metrics can be used to evaluate and compare different distributions, including metrics that are determined by actually replaying database operations against a system having a particular distribution, which can allow metrics such as CPU performance to be empirically determined.

If desired, a weighting can be applied to one or more of the variables in the scoring function. The weighting can be used to allow more direct correspondence between metrics, which can provide a more accurate score calculation. Or, the weighting can be used to reflect that some metrics can have a more measureable or important effect on performance than other metrics. In some cases, the effect of a metric may be related to a particular database system, such as particular software or settings of the database system, hardware used in the databases system, network considerations, expected workloads and use cases, a number of nodes, a number of tables, a degree of partitioning, a degree of replication, and similar considerations. For example, a particular database system may be more affected by an increased number of two-phase commit operations, such as based on the two-phase commit protocol used, than other databases systems, but may be less affected by skew in storage use. Accordingly, that database system may have a larger weighting factor applied to the number of two-phase commit operations for a particular table distribution scenario. In some aspects, weightings can be used by applying machine learning algorithms, where training data can include database configuration information and weightings, and evaluation can provide a suggested weighting for a given configuration.

In particular aspects, a scoring function can be represented as:

$$f = \alpha A + \beta B + \gamma C \ldots \varepsilon N \quad (1)$$

where f is the score, $\alpha$, $\beta$, $\gamma$, and c are weighting factors, and A, B, C, and N are values of particular metrics. As described above, the scoring function includes at least two metrics or variables, but can include a larger number if desired. In a more specific example, the scoring function is:

$$f = \alpha\{\text{two-phase commit count}\} + \beta\{\text{multinode query count}\} + \gamma\{\text{space usage distribution}\} + \delta\beta\{\text{processor time distribution}\} \quad (2)$$

where f if the score and $\alpha$, $\beta$, $\gamma$, and $\delta$ are weighting factors.

In some cases, the weighting factors can be constant values. However, more complex or variable weighting factors can be used as desired. In Equation 2, example values for the weighting factor $\alpha$ can be between about 0.001 and about 10, such as being about 0.01 and about 5, between about 0.01 and about 1, or between about 0.25 and about 1, including between 0.001 and 10, between 0.01 and 5, between 0.01 and 1, or between about 0.25 and 1. In particular examples, a is selected to be 0.025, 0.05, or 1.

Example values for the weighting factor $\beta$ in Equation 2 can be between about 0.0001 and about 10, such as between about 0.0001 and about 1, between about 0.001 and about 0.1, and between about 0.001 and about 0.01, including between 0.001 and 10, between 0.001 and 1, between 0.001 and 0.1, and between 0.001 and 0.01. In a particular example, $\beta$ is selected to be 0.005.

Example values for $\gamma$ and $\delta$ can be between about 1 and about 10,000, such as between about 10 and about 5000, between about 100 and about 2500, and between about 500 and about 2000, such as between 1 and 10,000, between 10 and 5000, between 100 and 2500, and between 500 and 2000. In a particular example, $\gamma$ and $\delta$ are selected as 1000.

Results generated by the analysis component 1032 can be provided to a distribution manager 1054 in a process 1050. The distribution manager 1054 can include a comparator component 1058. The comparator component 1058 can compare results from the analysis component 1032, including results from different placement methods, results from multiple runs of a placement method using the same parameters (e.g. execution times, weightings), results from multiple placement methods using different parameters (e.g., execution times, starting table placement, table ordering, scoring function weights), and combinations thereof. The comparator component 1058 can, in some cases, select, or provisionally select, a particular table distribution to be implemented or to be analyzed further. In other cases, the comparator 1058 can select a portion of suggested table distributions generated by the analysis component 1032 to be provided to a user, such as through a user interface component 1062.

The user interface component 1062 can allow a user to control the distribution manager 1054, and in turn the analysis component 1032 and optionally other components, such as a component (not shown) that generates the workload capture data 1012 or the test data 1022. For example, through the user interface 1062, the user can select particular workload capture data 1012 to be used, and parameters (such as transaction types, starting and ending periods) to be used in generating the test data 1022. The user interface 1062 can also allow a user to select particular methods of the analysis component 1032 to be used, as well as parameters for those methods, such as how many times the method should be carried out, how tables should be ordered for the round robin method 1042, or scoring function parameters and weights for use in the multivariate optimization method 1040. The user can also specify that particular tables must be maintained or particular nodes, must not be maintained on particular nodes, or must have a specified relation with other tables (such as being on the same node as another table or on a different node than another table).

The user interface 1062 can allow a user to select a particular table distribution to be implemented in a database system. Once a table distribution is selected, a table manager component 1066 can be called to make appropriate changes to the database system (e.g., to cause tables, or partitions, to be moved between nodes). If desired, the user can adjust the distribution prior to implementation.

The distribution manager 1054 can include a validation component 1070. The validation component 1070 can allow one or more suggested database distribution scenarios to be evaluated prior to deployment on a production system. For example, a test system can be configured with the selected table distribution. The appropriate workload capture data 1012 can be replayed on the test system and the performance of the test system evaluated. In some cases, the performance of the test system with the suggested table distribution can be compared with the performance of a database system from which the workload capture data 1012 was obtained.

Performance data of the capture system can be compared with performance data of the test system, with the proposed table distribution, to determine whether the proposed table distribution provides improved performance Or, the workload capture data 1012 can be replayed against two or more table distributions provided by the analysis component 1032. Performance data associated with the table distributions can be compared to determine which provides the best performance, or to evaluate tradeoffs between different distributions. For example, a table distribution that was associated with a lower score when generated by the analysis component 1032 may perform more poorly using a full replay workload than another table distribution that was associated with a higher score by the analysis component 1032. In some cases, replay can determine performance metrics other than, or in addition to, those determinable by evaluating read/write operations without executing such read/write operations.

The distribution manager 1054 can include a reporting component 1074. The reporting component 1074 can retrieve and format information for display to a user through the user interface 1062. For example, the reporting component 1074 can retrieve and format data provided by the analysis component 1032, the comparator 1058, or the validation component 1070.

Example 4—Example Iterative Table Distribution Analysis

In a particular examples, potential table distributions are generated using the simulated annealing technique. The simulated annealing technique makes iterative changes to a table distribution over a time period. After an iteration, a score of the distribution with the proposed change is compared with a score of the prior distribution. A characteristic of the simulated annealing technique is that the method may select a distribution with a proposed change even if the iterated distribution has a higher score than the prior distribution. In some cases, if the iterated distribution has a lower score than the prior distribution, the iterated distribution is always selected for the next step in the method. In other cases, the method may retain the higher score distribution rather than moving to the lower score state.

The probability of accepting a higher score state, or optionally rejecting a lower score state, varies over time. This time varying parameter is typically referred to as the temperature. Over time, the temperature "cools," resulting in a lower probability of accepting a higher score state, or optionally, rejecting a lower score state. A lower temperature is typically determined and used at each iteration. The method usually ends when the temperature reaches 0, at which time the distribution is "frozen" at the optimal solution determined by the method (given the initial conditions, method of determining iterations, temperature, cooling schedule, and cooling function). The results of the method can be influenced by the initial temperature chosen, and the annealing schedule (cooling function). The probabilistic function used also influences the final outcome of the method. In a particular example, the probabilistic function is:

$$e^{(h(A)-h(A'))/T} \quad (3)$$

where h(A) is the value of the scoring function at the current state, h(A') is the value of the scoring function at the iterated state, and T is the temperature. From this equation, it can be seen that the probability of moving to a higher-score state increases with increasing temperature. That is, larger temperatures in the denominator of the exponential component will result in smaller values, making the exponential component closer to 0 and thus the value of the result closer to 1 (i.e., because anything raised to the zero power is one). Similarly, the closer in value h(A) is to h(A'), the larger the probability will be of moving to a new state, as then h(A)−h(A') will be closer to zero, again making the exponential component closer to zero and the final result close to one (or, 100% probability of moving to the iterated state).

As discussed, various parameters of the simulated annealing method can be adjusted to make it more or less likely that a higher score state will be accepted. The following acceptance function provides a probability of accepting a higher score state that varies between 0 and 0.5:

$$\frac{1}{1+e^{(h(A')-h(A))/T}} \quad (4)$$

A suitable function for determining whether to accept a new state, where new lower energy states are always accepted, can be:

bool (move to new state) (float presentState, float iteratedState, float temperature)

```
{
float probability;
if (iteratedState < presentState) return true;
if (temperature == 0.0) return false;
probability = exp(iteratedState − presentState))/temperature);
float randomProbability = (float) rand( ) / (float)RAND_MAX;
return randomProbability < probability;
}
```

In some cases, the initial temperature, T, is selected to be between about 1 and about 10,000, such as between about 10 and about 10,000, between about 10 and about 5,000, between about 10 and about 2,500, between about 10 and about 1,000, between about 50 and about 500, between about 100 and about 5,000, between about 100 and about 2,500, between about 500 and about 2,500, or between about 750 and about 1,500, such as between 1 and 10,000, between 10 and 10,000, between 10 and 5,000, between 10 and 2,500, between 10 and 1,000, between 50 and 500, between 100 and 5,000, between 100 and 2,500, between 500 and 2,500, or between 750 and 1,500. In a particular example, the initial temperature is 100.

In some cases, the cooling schedule, or temperature reduction rate, can be calculated as T=T*R, where R is the reduction rate. An example reduction rate can be 0.9998. So, at each iteration, the new temperature T can be calculated as the prior temperature multiplied by 0.9998. As described above, the method can be set to run for a certain number of iterations, a certain run time, or until a threshold value is met. For instance, the method can run until the temperature T reaches 1 or less. Setting the reduction rate to be slower (e.g. a higher value, such as 0.99998) can result in more iterations being analyzed, which can potentially lead to lower score distributions, at the expense of run time and computing resources. The run time and resource use can be reduced by decreasing the value of R (e.g., to 0.95), but with possible reduction in the amount of optimization achieved by the method.

Regarding the generation of candidate table distributions, according to one example, a candidate distribution is generated by randomly selecting one table and randomly placing the table on a node. In other implementations, multiple tables can be randomly selected and placed in a single iteration. In other examples, a candidate distribution is generated in an ordered fashion, such as by moving tables in a round robin manner. In some implementations, a single table is moved in the round robin manner per iteration, while in other implementations multiple tables can be moved in each iteration.

In some aspects, temperatures can be maintained for an overall system, but can also be maintained for particular system components, such as tables or nodes. So, for example, a table can be associated with a temperature. The table can be moved, randomly or in an ordered fashioned, about the system. If the table is moved, and little to no score reduction is achieved, the temperature of the table can be reduced. When generating a new candidate distribution, the temperatures of the individual system objects can be taken into account. For example, tables with higher temperatures can be selected with a higher probability, or in accordance with a rule that the highest temperature table is selected, for movement to generate the next candidate distribution.

Example 5—Example Table Distribution Using Simulated Annealing

Figure 11:
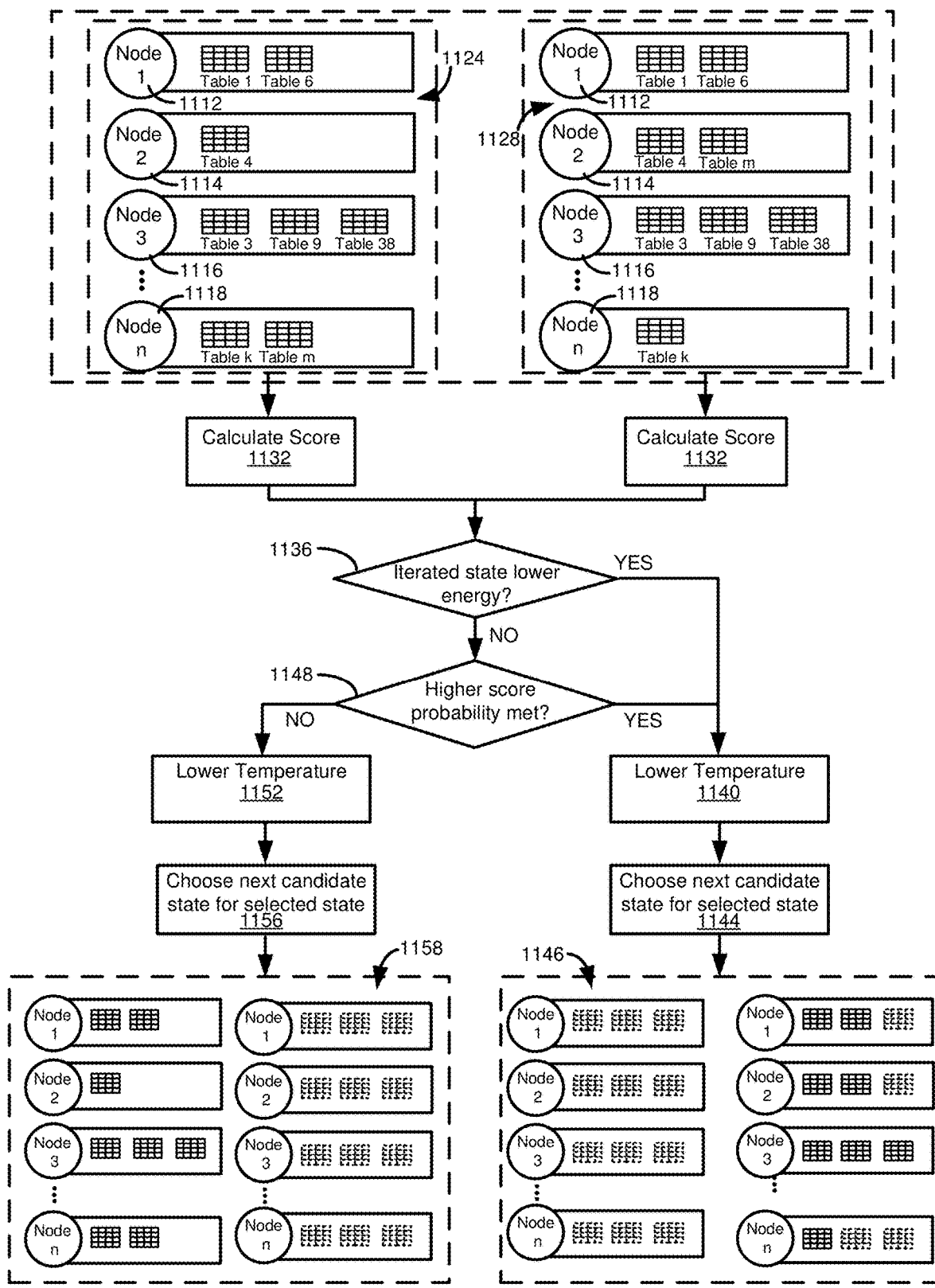
FIG. 11 schematically depicts an example of how table distributions can be iterated, their scores determined, and a table distribution selected for further analysis in order to determine a table distribution that can provide improved database performance.

FIG. 11 depicts how candidate table distributions can be iteratively generated and evaluated. FIG. 11 includes a system with n number of nodes. Specifically, the system includes a first node 1112, a second node 1114, a third node 1116, and the nth node 1118 are shown. In a current state 1124 (which can be an initial system state or a system state generated from a prior iteration), the first node 1112 includes Table 1 and Table 6, the second node 1114 includes Table 4, the third node 1116 includes Table 3, Table 9, and Table 38, and the nth node 1118 includes Table k and Table m.

FIG. 11 also depicts an iterated, or next, system state 1128. The system state 1128 is analogous to the system state 1124, with the exception that Table m has been moved from the nth node 1118 to the second node 1114. The scores of the states 1124, 1128 are calculated at 1132. At 1136, it is determined whether the iterated system state 1128 has a lower score than the current state 1124. If so, the temperature is lowered at 1140 and a next candidate state is chosen at 1144, depicted as the set of states 1146. The operations 1132, 1136 are then repeated. In other cases, 1136 can instead determine whether the probability is met for staying at a current, higher score state, instead of moving to a lower score state. If the probability is not met, the operations can proceed to 1152, as otherwise described herein.

If the transition is determined at 1136 not to be a transition to a lower score state, a probability function can be evaluated at 1148 to determine whether the method should move to a higher score state. As described above, this probability, or acceptance function, can be temperature dependent, such that moving to higher score states becomes less likely during the course of the method, as the temperature is lowered. If the probability is met, the operations can continue to 1140. If the probability is not met, the method can maintain the system state 1124 for further analysis. The temperature of the method can be lowered at 1152 and a next candidate state selected at 1156, providing the set of states 1158. The operations 1132, 1136 are then repeated.

As described above, the process depicted in FIG. 11 of generating a candidate state and evaluating whether to accept or reject the candidate can be carried out until a stopping condition is met. The stopping condition can be a number of iterations, a preset running time, or the reaching of another stopping condition, such as the temperature meeting a threshold or a target score being met.

Example 6—Example Simulated Annealing Operations

Figure 12:
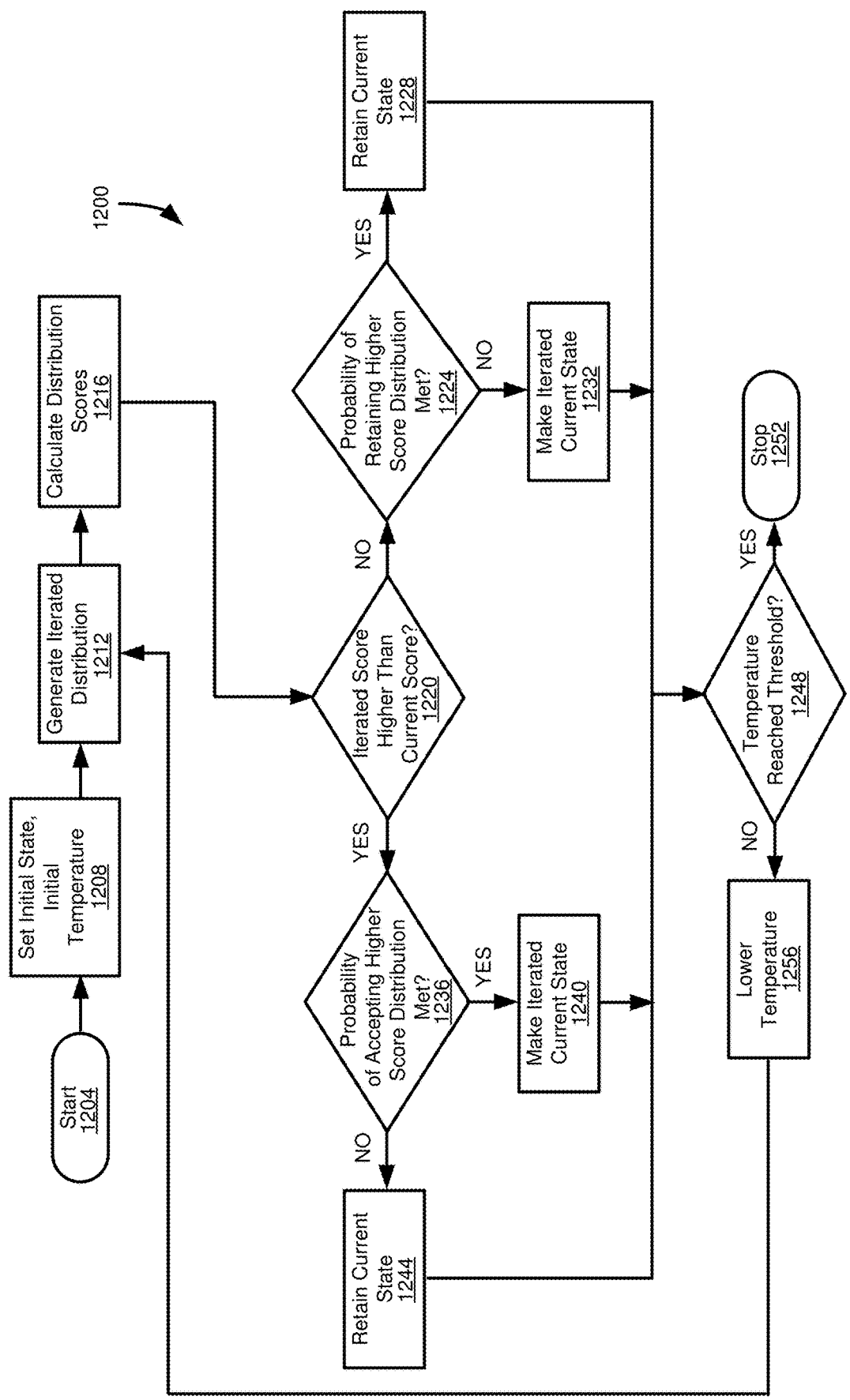
FIG. 12 is a flowchart of operations in an example method of determining a table distribution by iteratively analyzing possible table redistributions.

FIG. 12 illustrates a flowchart of operations 1200 for determining a table placement using a simulated annealing technique. The operations 1200 begin at 1204. At 1208 initial parameters (such as initial temperature, cooling schedule, acceptance criteria, and stopping criteria) are set, along with an initial state. The initial state can be an existing table distribution, a random table distribution, or another table distribution.

At 1212, an iterated table distribution is generated. The iterated table distribution can be generated by moving one or mode tables from the initial distribution to other nodes. In some cases, table movements can be determined in a random manner. In other cases, table movements can be moved according to a set sequence, such as using a round robin method.

Distribution scores are calculated at 1216. Calculating distribution scores can include determined one or more expected performance parameters based on a table distribution. Determining the performance parameters can include calculating the performance parameters using a test workload, which can be a workload obtained from an actual database system. In particular examples, the workload includes read and write operations for particular transactions, particular statements from particular transactions, particular statements that are not part of a transaction, or combinations thereof. For the test workload, metrics determined can include a number of commits that would be carried out across multiple nodes, such as using a two-phase commit protocol. Metrics can also include a number of multinode queries that would be expected using the work load. That is, in the case of commit operations and queries, for a given operation or query, it can be determined if the operation or query includes tables or partitions such that it can be executed at a single node or if the operation or query involves multiple nodes. Other metrics, such as measures of evenness of distribution of a number of tables, an amount of data storage used for tables, expected processor use, expected network resource use, or other computing resource uses or performance metrics are determined. The metrics can be adjusted using weighting factors, and a score calculated using an objective function.

At 1220, it is determined whether the score of the iterated table distribution is greater (or greater than or equal to) the score of the current distribution. If it is determined at 1220 that the score of the iterated distribution is not greater than (or greater than or equal to) the score of the current distribution, it is determined at 1224 whether the probability of retaining a higher score distribution is met. If the probably is met, the current distribution state is selected for further analysis at 1228. If the probability is not met, the iterated state is selected as the current state for further analysis at 1232.

If it is determined at 1220 that the score of the iterated state is not greater than (or not greater than or equal to) the score of the current distribution, it is determined at 1236 whether the probability of accepting a higher score distribution has been met. If the probability of accepting a higher score distribution has been met, the iterated state is selected to be the current state for further analysis at 1240. If it is determined at 1236 that the probability of accepting a higher score distribution has not been met, the current distribution state is selected for further analysis at 1244.

After selecting a state for further analysis at 1228, 1232, 1240, 1244, the operations 1200 proceed to determine at 1248 whether a threshold temperature has been reached, such as whether the temperature has reached zero or another value selected as a stopping criteria. Although 1248 describes checking a temperature, this operation can include checking to determine whether another, or one of multiple, stopping criteria have been met. If it is determined at 1248 that the temperature meets the stopping criteria (e.g., meets or is lower than a threshold), the operations 1200 can end at 1252. If it is determined at 1248 that the temperature does not meet the threshold, the temperature is lowered at 1256 and the operations 1200 proceed to 1212 to determine a next iteration.

Although shown in a particular order, it should be appreciated that at least some of the operations 1200 can occur in a different order. For example, a temperature can be lowered prior to determining whether a threshold temperature has been reached for purposes of determining whether the operations 1200 should end.

Example 7—Example Table Distributions

FIG. 13 illustrates simulated results comparing a greedy table placement method with a simulated annealing method. The greedy table placement method can operate by always choosing a table move that results in a lower score, as estimated using the objective function of Equation 2. In particular, FIG. 13 illustrates that output 1310 of the greedy method, which shows a final, optimized (for that method, given the operational parameters) table placement 1312, including identifying the nodes 1314, the percentage of table data 1316 maintained on the node, and the identities 1318 of the particular tables on the nodes. It can be seen that the greedy method results in approximately equal data distribution among the tables.

FIG. 13 illustrates the total score 1320 of the table placement, the coefficients 1322 used for the objective function, and the performance metrics 1324 included in the objective function. For each metric, FIG. 13 illustrates the raw, unweighted value, and the value obtained after multiplying the raw value by the appropriate coefficient from the objective function. The total score is equal to the weighted scores of the individual performance metrics 1324.

FIG. 13 presents analogous information for the output 1330 of a simulated annealing method, including identifying the table placements 1332, node identities 1334, percentage of data 1336 maintained on the node, and the identities of the particular tables 1338 on the nodes. The simulated annealing algorithm also provides approximately equal table distribution, but is more evenly distributed that the outcome of greedy method.

FIG. 13 illustrates, for the output 1330 of the simulated annealing method, the total score 1340 of the objective function, the coefficients 1342 used in the objective function, and the performance metrics 1344 included in the objective function. For each metric, FIG. 13 illustrates the raw, unweighted value, and the value obtained after multiplying the raw value by the appropriate coefficient from the objective function. The total score is equal to the weighted score of the individual performance metrics 1344.

It can be seen that the simulated annealing method provided a lower total placement score than the greedy method, 70809.7 versus 79359. The bulk of the improvement results from the reduction in the number of two-phase commit operations. However, score savings were also obtained by eliminating multinode selects and by overall improving (i.e., more evenly distributing) the distribution of table data and execution count (the number of statements executed at each node).

Figure 14A:
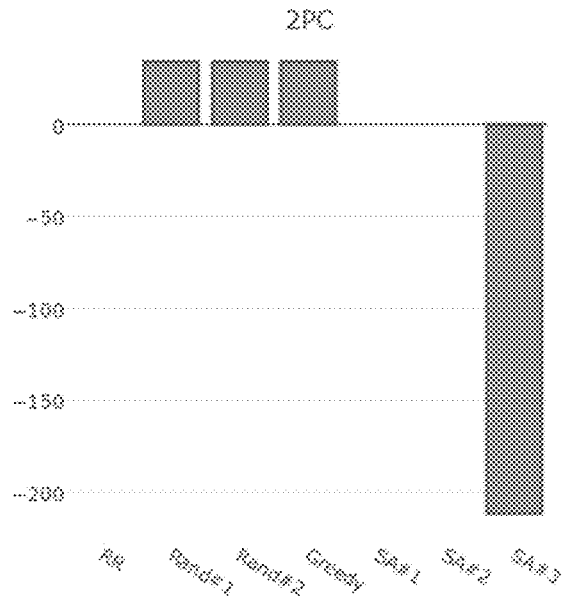
FIG. 14A is a graph illustrating a number of two-phase commit operations occurring with a sample database workload using table distributions provided by a round robin algorithm, two trials of a random placement method, a greedy placement method, and three trials of a simulated annealing method.
Figure 14B:
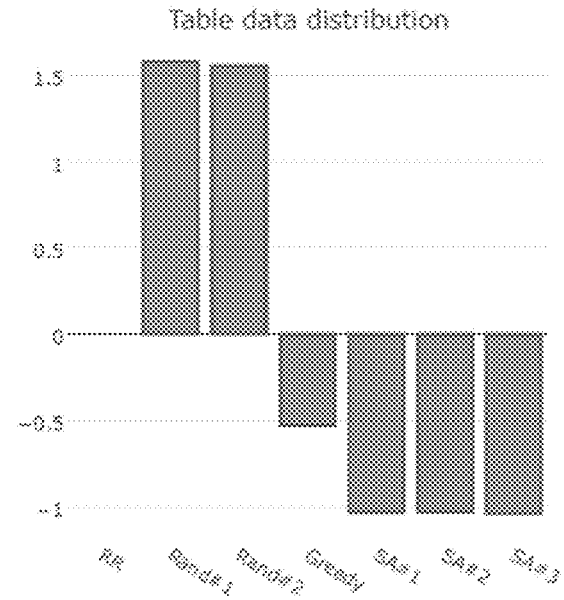
FIG. 14B is a graph illustrating evenness of table data distribution (measured as standard deviation) using table distributions provided by a round robin algorithm, two trials of a random placement method, a greedy placement method, and three trials of a simulated annealing method.
Figure 14C:
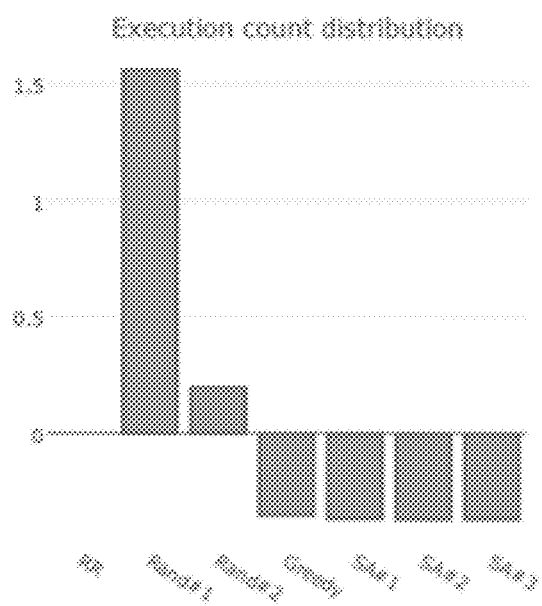
FIG. 14C is a graph illustrating evenness of database statement execution (measured as standard deviation) using table distributions provided by a round robin algorithm, two trials of a random placement method, a greedy placement method, and three trials of a simulated annealing method.
Figure 14D:
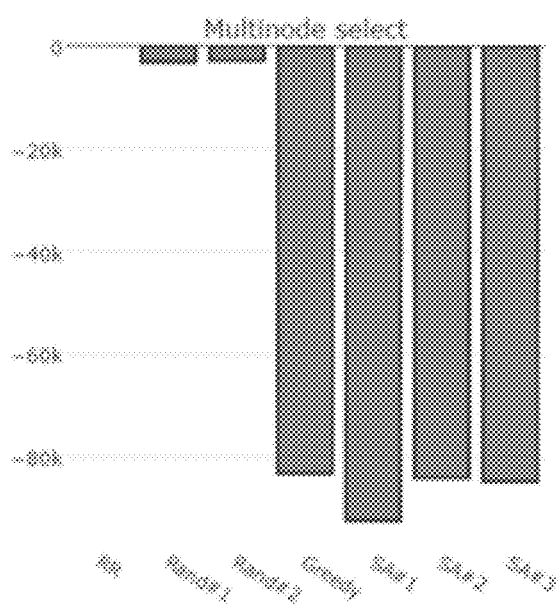
FIG. 14D is a graph illustrating a number of multinode select operations occurring with a sample database workload using table distributions provided by a round robin algorithm, two trials of a random placement method, a greedy placement method, and three trials of a simulated annealing method.

FIGS. 14A-14D illustrate improvements, shown by reduction in value, of two-phase commit operations (FIG. 14A), table data distribution (FIG. 14B), execution count distribution (FIG. 14C), and multinode select operations (FIG. 14D). The data presented are for the round robin method, the greedy method, two trials of a random placement method, and three trials of the simulated annealing method. All of the trials used the same score function. The calculated values were normalized with respect to the values for the round robin trial. It can be seen from FIG. 14A that the random and greedy methods performed worse than the round robin method. Two of the simulated annealing trials were approximately the same as the round robin method, while the third simulated annealing method showed significant improvement compared with round robin.

For table data distribution, it can be seen in FIG. 14B that all of the simulated annealing trials showed significant improvement compared with the round robin method. The greedy method showed some improvement, but not as great as the simulated annealing methods. The random trials performed more poorly than round robin.

With reference to FIG. 14C, the greedy method and the simulated annealing trials all performed better than round robin with respect to execution count distribution. Both of the random methods were worse than round robin. Finally, FIG. 14D illustrates that all of the methods performed better than round robin in reducing multinode selects. The random methods only showed slight improvements, but the greedy method and simulated annealing trials showed significant improvement.

Figure 15:
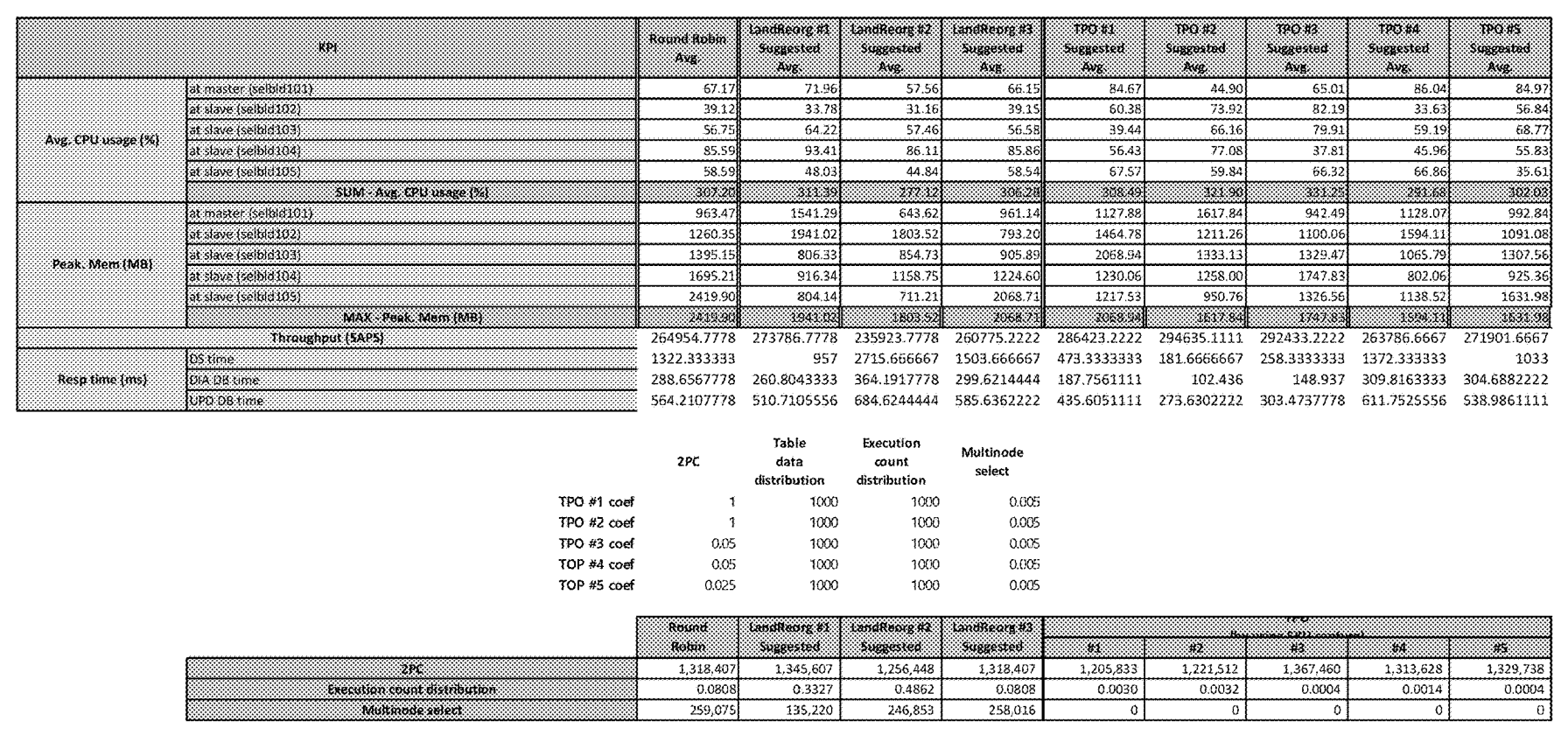

FIGS. 15-21 illustrate the results of table redistributions using the round robin method, three trials of the random placement method, and five simulated annealing trials. The simulation included a scale out system having a master node and four slave nodes. Simulated annealing trials 1 and 2 used identical scoring functions, while the weighting of the two-phase commit data was varied in trials 3-5. The simulated annealing parameters for the different trials are presented in FIG. 15. FIG. 15 also illustrates various performance metrics obtained by considering the effects of statement and transaction execution on the final, suggested table placements. The metrics include the average CPU and peak memory use at each node (from which the distribution information, such as standard deviation) can be calculated. The metrics also include the number of two-phase commit operations, number of multinode select operations, and the distribution (standard deviation) of statement executions in the system.

FIGS. 16-21 illustrate the table placement distributions suggested by each method/trial in FIG. 15. FIGS. 16-21 thus illustrate how different methods of determining table placement, and different parameters used with the simulated annealing technique, can affect the table distribution, and in turn how the table distribution can affect performance metrics.

Example 8—Example Operations in Table Distribution Determination

Figure 22:
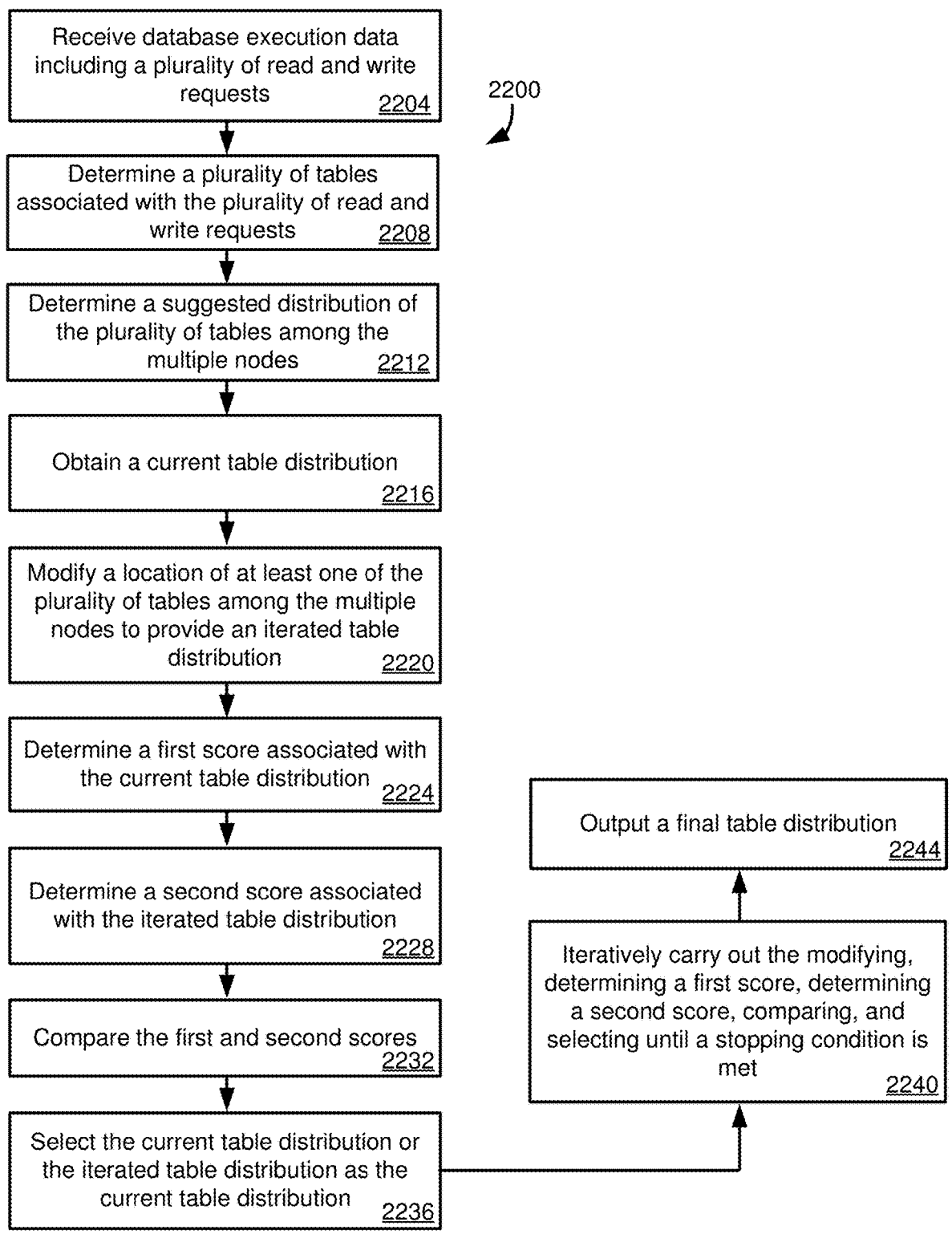
FIG. 22-24 are flowcharts of example methods for determining a table distribution for a multinode distributed database environment.

FIG. 22 depicts operations according to a method 2200 for determining a table distribution in a multinode database system. The method 2200 can be carried out, for example, in the architecture 1000 of FIG. 10.

At 2204 database execution data is received. The database execution data includes a plurality of read and write requests that are executable in the multinode database system. The read and write requests can be associated with a plurality of statements, at least a portion of which can be associated with transactions. A plurality of tables associated with the plurality of read and write requests are determined at 2208. The plurality of tables can represent tables whose distribution is to be optimized. If desired, a portion of the tables can be designated as being required to be maintained at a particular node, or a particular subset of available nodes.

At 2212, a suggested distribution of the plurality of tables among the multiple nodes is determined. The determining can include obtaining a current table distribution at 2216. If the determining is in the initial iteration, the current table distribution can be a randomly determined distribution, an existing distribution, a distribution provided by a user, a distribution suggested by another placement method, or a distribution from another source. A location of at least one of the plurality of tables among the multiple nodes is modified at 2220 to provide an iterated table distribution. The location to which the table or tables are moved can be determined randomly, according to rules, or by other criteria.

At 2224 a first score is determined that is associated with the current table distribution. The score can be determined by calculating one or more execution metrics resulting from (or that would result from) executing the plurality of read and write requests using the current table distribution. The scores can include determining a number of two-phase commit operations or multinode select operations that would be incurred by executing the read and write requests, or metrics regarding the distribution of computing resource use with a given table distribution. A second score associated with the iterated distribution is determined at 2228, and can be calculated in a similar manner as the first score.

The first and second scores are compared at 2232. At 2236, based at least in part on the comparing, the current table distribution or the iterated table distribution is selected as the current table distribution. That is, either the current distribution is maintained for further analysis or the current distribution is replaced by the iterated distribution. The modifying, determining a first score, determining a second score, comparing, and selecting are iteratively carried out, at 2240, until a stopping condition is met. The stopping condition can be a number of iterations, a running time, a parameter value associated with an optimization method (such as a temperature for a simulated annealing method), or the satisfying of a threshold score. A final table distribution is output at 2244.

Figure 23:
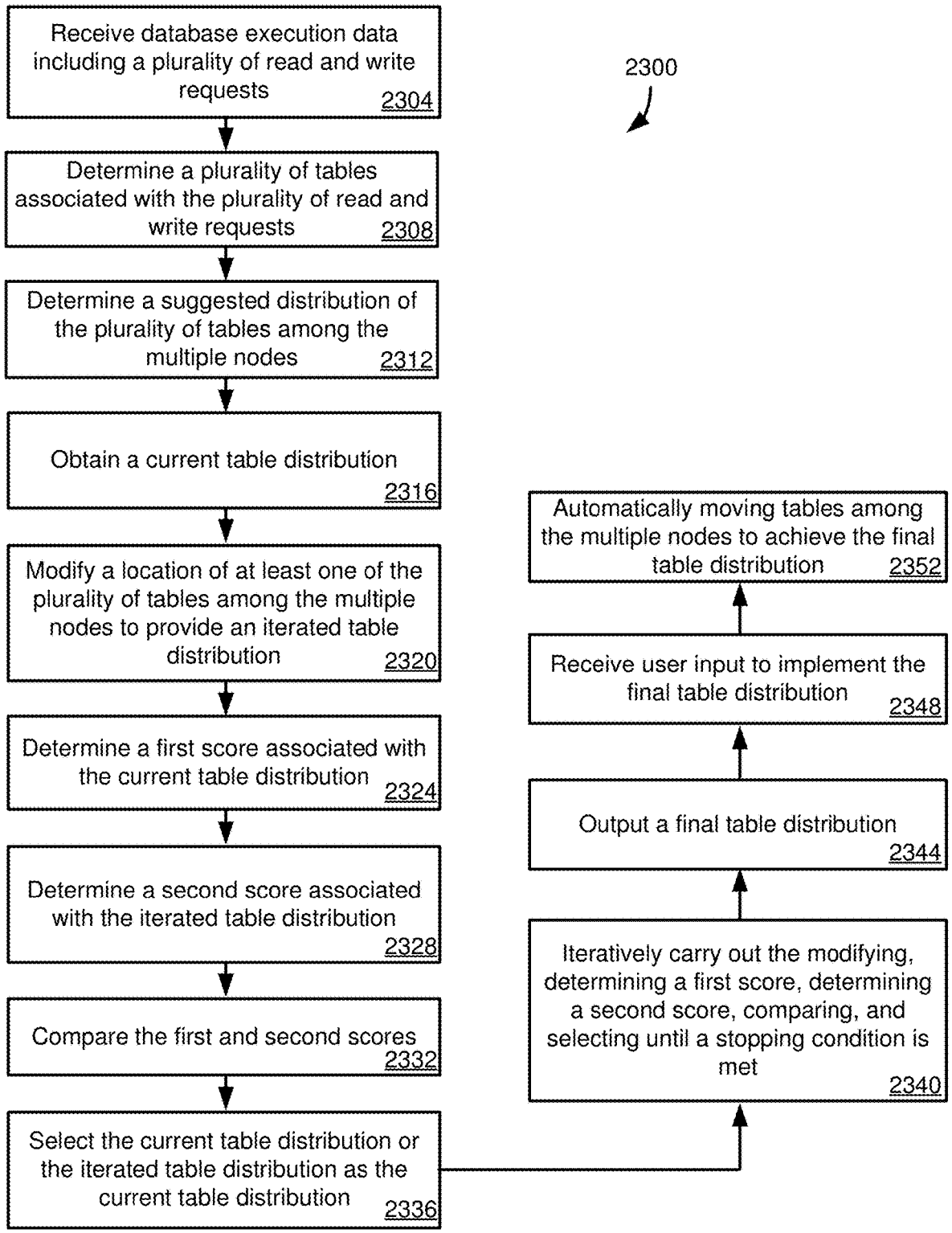

FIG. 23 depicts operations according to a method 2300 for determining a table distribution in a multinode database system. The method 2300 can be carried out, for example, in the architecture 1000 of FIG. 10.

At 2304 database execution data is received. The database execution data includes a plurality of read and write requests that are executable in the multinode database system. The read and write requests can be associated with a plurality of statements, at least a portion of which can be associated with transactions. A plurality of tables associated with the plurality of read and write requests are determined at 2308. The plurality of tables can represent tables whose distribution is to be optimized. If desired, a portion of the tables can be designated as being required to be maintained at a particular node, or a particular subset of available nodes.

At 2312, a suggested distribution of the plurality of tables among the multiple nodes is determined. The determining can include obtaining a current table distribution at 2316. If the determining is in the initial iteration, the current table distribution can be a randomly determined distribution, an existing distribution, a distribution provided by a user, a distribution suggested by another placement method, or a distribution from another source. A location of at least one of the plurality of tables among the multiple nodes is modified at 2320 to provide an iterated table distribution. The location to which the table or tables are moved can be determined randomly, according to rules, or by other criteria.

At 2324 a first score is determined that is associated with the current table distribution. The score can be determined by calculating one or more execution metrics resulting from (or that would result from) executing the plurality of read and write requests using the current table distribution. The scores can include determining a number of two-phase commit operations or multinode select operations that would be incurred by executing the read and write requests, or metrics regarding the distribution of computing resource use with a given table distribution. A second score associated with the iterated distribution is determined at 2328, and can be calculated in a similar manner as the first score.

The first and second scores are compared at 2332. At 2336, based at least in part on the comparing, the current table distribution or the iterated table distribution is selected as the current table distribution. That is, either the current distribution is maintained for further analysis or the current distribution is replaced by the iterated distribution. The modifying, determining a first score, determining a second score, comparing, and selecting are iteratively carried out, at 2340, until a stopping condition is met. The stopping condition can be a number of iterations, a running time, a parameter value associated with an optimization method (such as a temperature for a simulated annealing method), or the satisfying of a threshold score.

A final table distribution is output at 2344. At 2348, user input is received to implement the final table distribution. Tables are automatically moved among the multiple nodes, at 2352, to achieve the final table distribution.

Figure 24:
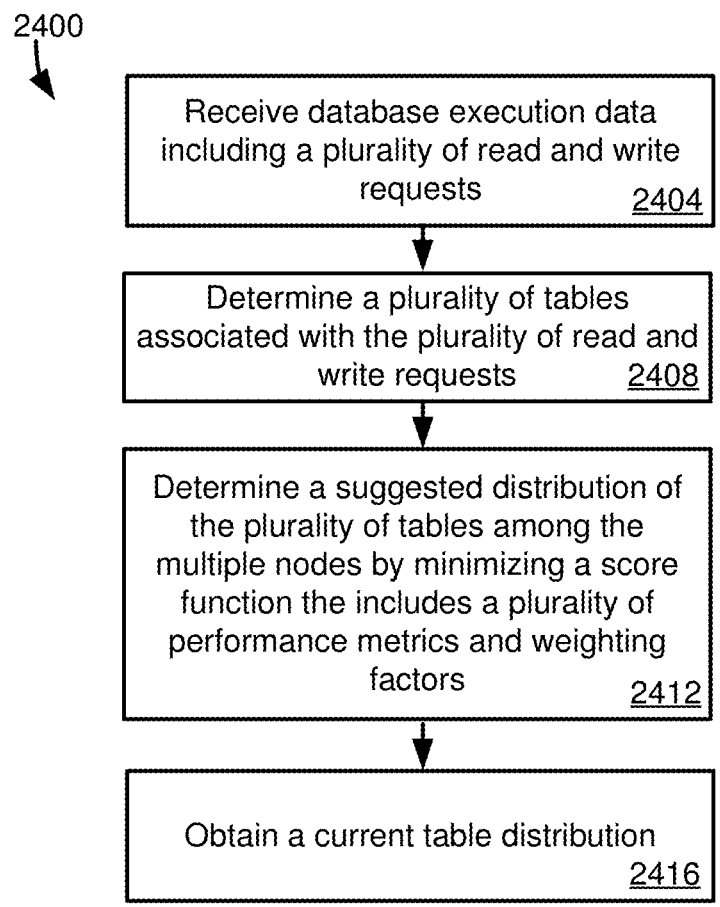

FIG. 24 depicts operations according to a method 2400 for determining a table distribution in a multinode database system. The method 2400 can be carried out, for example, in the architecture 1000 of FIG. 10.

At 2404 database execution data is received. The database execution data includes a plurality of read and write requests that are executable in the multinode database system. The read and write requests can be associated with a plurality of statements, at least a portion of which can be associated with transactions. A plurality of tables associated with the plurality of read and write requests are determined at 2408. At 2412, a suggested distribution of the plurality of tables among the multiple nodes is determined. The determining includes minimizing a score function that includes a plurality of performance metrics. At least a portion of the performance metrics are associated with a weighting factor. The minimizing includes iteratively comparing scores of candidate table distributions. A final table distribution is output, such as to a user on a display device, or provided to a software application, at 2416.

Example 9—Computing Systems

Figure 25:
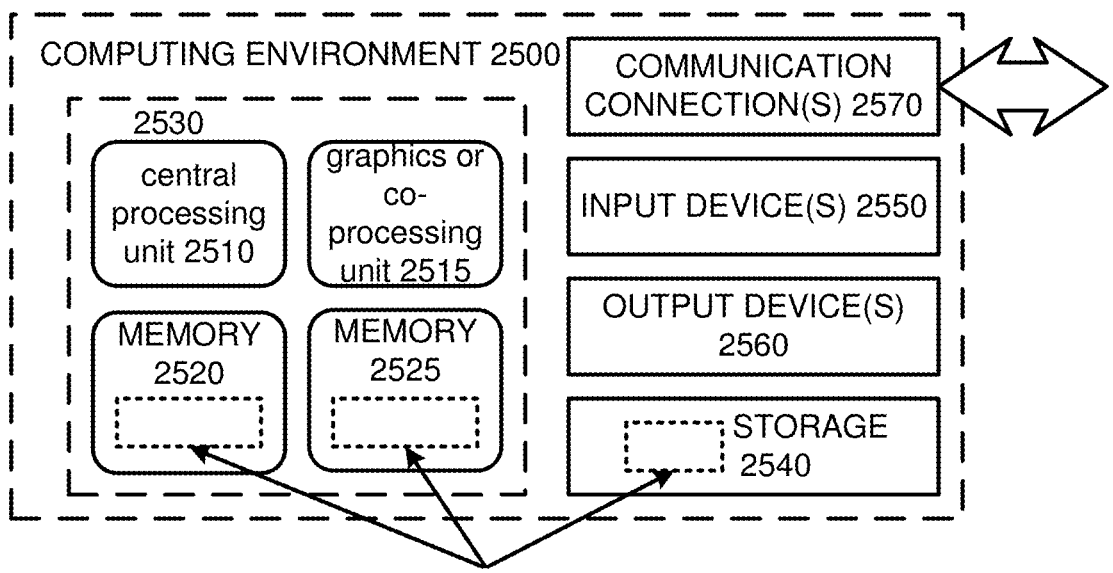
FIG. 25 is a diagram of an example computing system in which some described embodiments can be implemented.

FIG. 25 depicts a generalized example of a suitable computing system 2500 in which the described innovations may be implemented. The computing system 2500 is not intended to suggest any limitation as to scope of use or functionality of the present disclosure, as the innovations may be implemented in diverse general-purpose or special-purpose computing systems.

With reference to FIG. 25, the computing system 2500 includes one or more processing units 2510, 2515 and memory 2520, 2525. In FIG. 25, this basic configuration 2530 is included within a dashed line. The processing units 2510, 2515 execute computer-executable instructions, such as for implementing a database environment, and associated methods, described in Examples 1-8. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 25 shows a central processing unit 2510 as well as a graphics processing unit or co-processing unit 2515. The tangible memory 2520, 2525 may be volatile memory (e.g., registers, cache, RAM), non-volatile memory (e.g., ROM, EEPROM, flash memory, etc.), or some combination of the two, accessible by the processing unit(s) 2510, 2515. The memory 2520, 2525 stores software 2580 implementing one or more innovations described herein, in the form of computer-executable instructions suitable for execution by the processing unit(s) 2510, 2515. The memory 2520, 2525, may also store database data, such as data in the row store 262 or the column store 264 of FIG. 2.

A computing system 2500 may have additional features. For example, the computing system 2500 includes storage 2540 (such as for storing persisted data 272 of FIG. 2), one or more input devices 2550, one or more output devices 2560, and one or more communication connections 2570. An interconnection mechanism (not shown) such as a bus, controller, or network interconnects the components of the computing system 2500. Typically, operating system software (not shown) provides an operating environment for other software executing in the computing system 2500, and coordinates activities of the components of the computing system 2500.

The tangible storage 2540 may be removable or non-removable, and includes magnetic disks, magnetic tapes or cassettes, CD-ROMs, DVDs, or any other medium which can be used to store information in a non-transitory way and which can be accessed within the computing system 2500. The storage 2540 stores instructions for the software 2580 implementing one or more innovations described herein.

The input device(s) 2550 may be a touch input device such as a keyboard, mouse, pen, or trackball, a voice input device, a scanning device, or another device that provides input to the computing system 2500. The output device(s) 2560 may be a display, printer, speaker, CD-writer, or another device that provides output from the computing system 2500.

The communication connection(s) 2570 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 26:
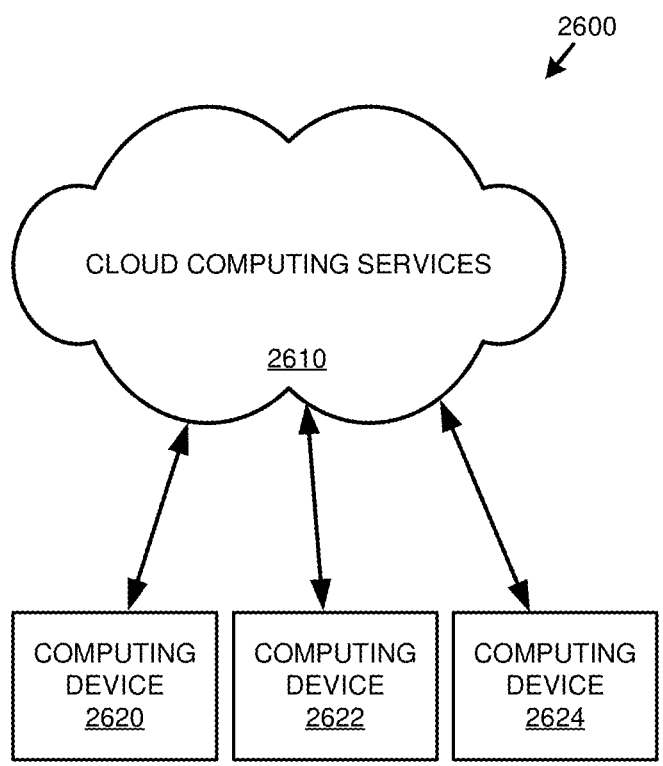
FIG. 26 is an example cloud computing environment that can be used in conjunction with the technologies described herein.

FIG. 26 depicts an example cloud computing environment 2600 in which the described technologies can be implemented. The cloud computing environment 2600 comprises cloud computing services 2610. The cloud computing services 2610 can comprise various types of cloud computing resources, such as computer servers, data storage repositories, networking resources, etc. The cloud computing services 2610 can be centrally located (e.g., provided by a data center of a business or organization) or distributed (e.g., provided by various computing resources located at different locations, such as different data centers and/or located in different cities or countries).

The cloud computing services 2610 are utilized by various types of computing devices (e.g., client computing devices), such as computing devices 2620, 2622, and 2624. For example, the computing devices (e.g., 2620, 2622, and 2624) can be computers (e.g., desktop or laptop computers), mobile devices (e.g., tablet computers or smart phones), or other types of computing devices. For example, the computing devices (e.g., 2620, 2622, and 2624) can utilize the cloud computing services 2610 to perform computing operators (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 22, computer-readable storage media include memory 2220 and 2225, and storage 2240. The term computer-readable storage media does not include signals and carrier waves. In addition, the term computer-readable storage media does not include communication connections (e.g., 2270).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method for distributing a plurality of tables among a plurality of nodes in a distributed, multi-node, database environment, the method, carried out using one or more processors in communication with one or more memories storing computer-executable instructions for carryout out the method, comprising operations for:

receiving database execution data comprising a plurality of read and write requests executable in the multi-node database system;

determining a plurality of tables associated with the plurality of read and write requests;

determining a suggested distribution of the plurality of tables among the multiple nodes, the determining comprising carrying out a plurality of iterations of an iterative distribution evaluation process comprising:
obtaining a current table distribution;
modifying a location of at least one of the plurality of tables among the multiple nodes to provide a first iterated table distribution;
determining a first score associated with the current table distribution by calculating one or more execution metrics resulting from executing the plurality of read and write requests using the current table distribution;
executing the plurality of read and write requests using the first iterated table distribution;
measuring one or more execution metrics resulting from the executing the plurality of read and write requests using the first iterated table distribution;
determining a second score associated with the first iterated table distribution using the one or more execution metrics resulting from executing the plurality of read and write requests using the first iterated table distribution;
comparing the first and second scores;
based at least in part on the comparing, selecting the first iterated table distribution as a current table distribution being evaluated in the iterative distribution evaluation process;
determining that a stopping condition for the iterative distribution evaluation process has not been met;
in the first iterated table distribution, modifying a location of at least one of the plurality of tables among the multiple nodes to provide a second iterated table distribution;
executing the plurality of read and write requests using the second iterated table distribution;
measuring one or more execution metrics resulting from the executing the plurality of read and write requests using the second iterated table distribution;
determining a third score associated with the second iterated table distribution using one or more execution metrics resulting from executing the plurality of read and write requests using the second iterated table distribution;
comparing the second and third scores;
based at least in part on the comparing the second and third scores, selecting the first iterated table distribution as the current table distribution being evaluated in the iterative distribution evaluation process;
determining that the stopping condition for the iterative distribution evaluation process has been met;
in response to the determining that the stopping condition for the iterative distribution evaluation process has been met, outputting a final table distribution, the final table distribution comprising an identifier for each of the multiple nodes and identifiers for tables of the multiple tables associated with respective nodes of the multiple nodes.

2. The method of claim 1, wherein the one or more execution metrics for the second score comprise a number of database operations that are carried out at the multiple nodes.

3. The method of claim 1, wherein the one or more execution metrics for the second score comprise a number of transaction commit operations that are coordinated among a plurality of the multiple nodes.

4. The method of claim 1, wherein the one or more execution metrics for the second score comprise a number of query operations that retrieve data from a plurality of the multiple nodes.

5. The method of claim 1, wherein the determining the second score comprises determining at least one metric indicating an evenness of distribution of computing resources associated with the first iterated tale distribution.

6. The method of claim 5, wherein the at least one metric indicates an evenness of distribution of table data.

7. The method of claim 5, wherein the at least one metric indicates an evenness of distribution of processor use during the execution of the plurality of read and write requests.

8. The method of claim 5, wherein the at least one metric indicates an evenness of distribution of memory use during the execution of the plurality of read and write requests.

9. The method of claim 5, wherein the at least one metric indicates an evenness of distribution of query language statement executions during the execution of the plurality of read and write requests.

10. The method of claim 1, wherein the determining a second score comprises evaluating an objective function comprising a plurality of execution metrics.

11. The method of claim 10, wherein the objection function comprises:

$$f=\alpha\{\text{two-phase commit count}\}+\beta\{\text{multinode query count}\}+\gamma\{\text{space usage distribution}\}+\delta\{\text{processor time distribution}\}$$

where f is selected from the group consisting of the first score and the second score, two-phase commit count is a number of two-phase commit operations determined to occur during execution of the read and write requests using a given table distribution, multinode query count is a number of multinode queries determined to occur during execution of the read and write requests using the given table distribution, space usage distribution is a distribution of storage space for database tables determined to occur during execution of the read and write requests using the given table distribution, processor time distribution is a distribution of processor use determined to occur during execution of the read and write requests using the given table distribution, and $\alpha$, $\beta$, $\gamma$, and $\delta$ are weighting factors.

12. The method of claim 1, wherein comparing the second and third scores comprises determining that the third score is less than the second score, further comprising determining that a probability is met for selecting the second score.

13. The method of claim 1, wherein comparing the second and third scores comprises determining that the third score is higher than the second score, further comprising determining that a probability is met for selecting the third score.

14. The method of claim 1, wherein the first score is lower than the second score and the selecting first iterated table distribution is carried out by determining whether a probability of accepting the second score is met, wherein the probability depends on a variable that decreases over the iterations.

15. The method of claim 14, wherein the variable is a temperature factor that decreases from an initial value.

16. The method of claim 15, wherein the stopping condition comprises a threshold temperature.

17. The method of claim 1, further comprising automatically redistributing the plurality of tables according to the final table distribution.

18. The method of claim 1, wherein the executing the plurality of read and write requests using the first iterated table distribution comprises simulating the execution of the plurality of read and write requests using the first iterated table distribution.

19. A computing system configured to determine an improved table distribution for a distributed database system, the computing system comprising:
a memory;
one or more processing units coupled to the memory; and
one or more non-transitory computer readable storage media storing instructions that, being loaded into the memory, cause the one or more processing units to perform operations for:
receiving database execution data comprising a plurality of read and write requests executable in a multi-node database system;
determining a plurality of tables associated with the plurality of read and write requests;
determining a suggested distribution of the plurality of tables among the multiple nodes, the determining comprising carrying out a plurality of iterations of an iterative distribution evaluation process comprising:
obtaining a current table distribution;
modifying a location of at least one of the plurality of tables among the multiple nodes to provide a first iterated table distribution;
determining a first score associated with the current table distribution by calculating one or more execution metrics resulting from executing the plurality of read and write requests using the current table distribution;
executing the plurality of read and write requests using the first iterated table distribution;
measuring one or more execution metrics resulting from the executing the plurality of read and write requests using the first iterated table distribution;
determining a second score associated with the first iterated table distribution using the one or more execution metric resulting from executing the plurality of read and write requests using the first iterated table distribution;
comparing the first and second scores;
based at least in part on the comparing, selecting the first iterated table distribution as a current table distribution being evaluated in the iterative distribution evaluation process;
determining that a stopping condition for the iterative distribution evaluation process has not been met;
in the first iterated table distribution, modifying a location of at least one of the plurality of tables among the multiple nodes to provide a second iterated table distribution;
executing the plurality of read and write requests using the second iterated table distribution;
measuring one or more execution metrics resulting from the executing the plurality of read and write requests using the second iterated table distribution;
determining a third score associated with the second iterated table distribution using the one or more execution metrics resulting from executing the plurality of read and write requests using the second iterated table distribution;
comparing the second and third scores;

based at least in part on the comparing the second and third scores, selecting the first iterated table distribution as the current table distribution being evaluated in the iterative distribution evaluation process;

determining that the stopping condition for the iterative distribution evaluation process has been met;

in response to the determining that the stopping condition for the iterative distribution evaluation process has been met, outputting a final table distribution, the final table distribution comprising an identifier for each of the multiple nodes and identifiers for tables of the multiple tables associated with respective nodes of the multiple nodes;

receiving user input to implement the final table distribution; and automatically moving tables among the multiple nodes to achieve the final table distribution.

* * * * *